(12) United States Patent
Futae et al.

(10) Patent No.: US 10,605,160 B2
(45) Date of Patent: Mar. 31, 2020

(54) TURBOMACHINE

(71) Applicant: MITSUBISHI HEAVY INDUSTRIES ENGINE & TURBOCHARGER, LTD., Sagamihara-shi, Kanagawa (JP)

(72) Inventors: Takaya Futae, Tokyo (JP); Yosuke Danmoto, Tokyo (JP); Tadasuke Nishioka, Tokyo (JP); Yoji Akiyama, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 365 days.

(21) Appl. No.: 15/518,508

(22) PCT Filed: Nov. 17, 2014

(86) PCT No.: PCT/JP2014/080337
§ 371 (c)(1),
(2) Date: Apr. 12, 2017

(87) PCT Pub. No.: WO2016/079781
PCT Pub. Date: May 26, 2016

(65) Prior Publication Data
US 2017/0234213 A1 Aug. 17, 2017

(51) Int. Cl.
*F02B 39/14* (2006.01)
*F16C 33/10* (2006.01)
(Continued)

(52) U.S. Cl.
CPC ............ *F02B 39/14* (2013.01); *F01D 25/166* (2013.01); *F01D 25/18* (2013.01); *F04D 29/051* (2013.01);
(Continued)

(58) Field of Classification Search
None
See application file for complete search history.

(56) References Cited

U.S. PATENT DOCUMENTS 4,095,857 A * 6/1978 Palmer ................. F01D 25/186
184/6.11
4,664,605 A 5/1987 Asano et al.
(Continued)

FOREIGN PATENT DOCUMENTS

CN 101983282 A 3/2011
CN 102733932 A 10/2012
(Continued)

OTHER PUBLICATIONS

JP H02-046028 google translation.*
(Continued)

*Primary Examiner* — Christopher Verdier
*Assistant Examiner* — Jason A Fountain
(74) *Attorney, Agent, or Firm* — Birch, Stewart, Kolasch & Birch, LLP

(57) ABSTRACT

A turbomachine includes: a rotational shaft; a pair of thrust collars disposed around the rotational shaft; a thrust bearing disposed around the rotational shaft at an axial directional position between the pair of thrust collars; and an oil-drain channel disposed around the rotational shaft, for draining lubricant oil after lubricating a sliding portion between the thrust bearing and the thrust collars. The oil-drain channel includes: an oil-drain port portion for discharging the lubricant oil inside the oil-drain channel downward; and an oil-guide channel portion disposed above the oil-drain port portion and configured to guide the lubricant oil from the sliding portion in a circumferential direction of the rotational shaft to the oil-drain port portion. The oil-guide channel portion has an asymmetric shape with respect to a rotational direction of the rotational shaft, the oil-guide channel por-
(Continued)

tion having a minimum flow-path cross sectional area at a first position on an upstream side in the rotational direction, and a maximum flow-path cross sectional area at a second position on a downstream side of the first position.

13 Claims, 20 Drawing Sheets

(51) Int. Cl.
*F16C 17/04* (2006.01)
*F01D 25/16* (2006.01)
*F01D 25/18* (2006.01)
*F04D 29/051* (2006.01)
*F04D 29/063* (2006.01)

(52) U.S. Cl.
CPC ............ *F04D 29/063* (2013.01); *F16C 17/04* (2013.01); *F16C 33/106* (2013.01); *F16C 33/1025* (2013.01); *F05D 2220/40* (2013.01); *F05D 2250/312* (2013.01); *F16C 2360/24* (2013.01)

(56) References Cited

U.S. PATENT DOCUMENTS

| | | | |
|---|---|---|---|
| 8,794,905 | B2 | 8/2014 | Matsuyama |
| 9,400,012 | B2 | 7/2016 | Iwata et al. |
| 2007/0092387 | A1 | 4/2007 | Ward |
| 2013/0142679 | A1 | 6/2013 | Hornbach et al. |
| 2018/0156268 | A1* | 6/2018 | Bunno .................... F02B 39/14 |
| 2018/0156269 | A1* | 6/2018 | Bunno .................. F01D 25/166 |
| 2018/0371985 | A1* | 12/2018 | Nambu .................. F01D 25/20 |

FOREIGN PATENT DOCUMENTS

| | | |
|---|---|---|
| DE | 10 2013 005 167 B3 | 9/2014 |
| JP | 61-202648 U | 12/1986 |
| JP | 2-46028 U | 3/1990 |
| JP | 6-317171 A | 11/1994 |
| JP | 7-217441 A | 8/1995 |
| JP | 9-41982 A | 2/1997 |
| JP | 11-2136 A | 1/1999 |
| JP | 2006-125343 A | 5/2006 |
| JP | 2013-36555 A | 2/2013 |
| JP | 2014-134134 A | 7/2014 |
| JP | 2015-34471 A | 2/2015 |
| WO | WO 2013/106303 A1 | 7/2013 |
| WO | WO 2013/145078 A1 | 10/2013 |

OTHER PUBLICATIONS

Office Action dated Jan. 12, 2018 issued to the corresponding Japanese Application No. 2016-559703 with an English Machine Translation.
Extended European Search Report effective Jan. 17, 2018 issued to the corresponding EP Application No. 14906219.2.
Office Action effective Jul. 16, 2018 issued to the corresponding Chinese Application No. 201480082636.3 with a Machine Translation.
International Search Report, issued in PCT/JP2014/080337 (PCT/ISA/210), dated Feb. 24, 2015.
International Preliminary Report on Patentability dated Jun. 1, 2017 in corresponding International (PCT) Application No. PCT/JP2014/080337 with English Translation.
2nd Office Action effective Jul. 9, 2019 issued to the corresponding Chinese Application No. 201480082636.3 with Machine Translation.
2nd Office Action effective Apr. 9, 2019 issued to the corresponding Chinese Application No. 201480082636.3 with Machine Translation.

* cited by examiner

TURBOMACHINE

TECHNICAL FIELD

The present disclosure relates to a turbomachine including a thrust bearing.

BACKGROUND ART

For various turbomachines, a thrust bearing is provided between a pair of thrust collars disposed around a rotor shaft, so that the thrust bearing bears loads along the axial direction of the rotor shaft (thrust loads). Lubricant oil is supplied to sliding portions between the thrust bearing and the thrust collars. After lubricating the sliding portions between the thrust bearing and the thrust collars, the lubricant oil is discharged via an oil-drain channel formed around the rotor shaft.

The oil-drain channel may be a space surrounded by an end surface of the thrust bearing and a bearing groove formed on an inner wall surface of a bearing housing, a space surrounded by the other end surface of the thrust bearing and an oil deflector, or a space surrounded by a partition wall dividing a working-fluid channel and a bearing space, for instance.

Patent Document 1 discloses a turbocharger for preventing lubricant oil from blocking an oil-drain port portion for discharging lubricant oil from a space (oil-drain channel) surrounded by the other end surface of a thrust bearing and an oil deflector.

The turbocharger includes a tongue portion inclined from the horizontal direction formed at a lower part of the oil deflector, which prevents lubricant oil from blocking the oil-drain port portion of the space (oil-drain channel) surrounded by the other end surface of the thrust bearing and the oil deflector.

CITATION LIST

Patent Literature

Patent Document 1: JPH11-2136A

SUMMARY

Problems to be Solved

The present inventors conducted CFD analyses on the flow of lubricant oil after lubricating sliding portions between a thrust bearing and thrust collars. As a result, it was found that the lubricant oil after lubricating the sliding portions between the thrust bearing and the thrust collars has a swirl component along the rotational direction of the rotor shaft inside the oil-drain channel. Further, it was found that lubricant oil with a swirling component gets attracted toward an outer peripheral wall of an oil-guide channel portion disposed above an oil-drain port portion of the oil-drain channel, inside the oil-guide channel portion, to flow along the outer peripheral wall of the oil-guide channel portion toward the oil-drain port portion.

Accordingly, lubricant oil flows along the outer wall surface of the oil-guide channel portion inside the oil-guide channel portion of the oil-drain channel, and thus during low-speed rotation of a turbomachine (or when the amount of supply of lubricant oil is small), the gas-liquid boundary surface of lubricant oil flowing along the outer peripheral wall of the oil-guide channel portion is disposed outside the outer peripheral surface of the thrust collar in the radial direction, and thereby the lubricant oil and the outer peripheral surface of the thrust collar do not make direct contact with each other.

However, with an increase in the rotation speed of the turbomachine (or in the amount of supply of lubricant oil), the amount of lubricant oil inside the oil-guide channel portion increases, so that the gas-liquid boundary surface moves inward in the radial direction inside the oil-guide channel portion, which may bring about contact between the lubricant oil and the outer peripheral surfaces of the thrust collars. Meanwhile, lubricant oil scatters from a wide angular region of sliding portions between the thrust bearing and the thrust collars, hits the outer peripheral wall of the oil-guide channel portion, and flows toward the oil-drain port portion while being guided by the outer peripheral wall. Thus, the amount of lubricant oil tends to increase particularly in a downstream region of the oil-guide channel portion, which may bring about contact between the lubricant oil and the outer peripheral surfaces of the thrust collars. If the lubricant oil and the outer peripheral surfaces of the thrust collars make contact with each other, the thrust collars stir the lubricant oil and cause mechanical loss.

Patent Document 1 discloses a tongue portion of an oil deflector for forming an oil-drain port portion inclined from the horizontal direction, provided to prevent lubricant oil from blocking an oil-drain port portion for discharging lubricant oil, but does not mention improving the shape of the oil-guide channel portion.

Thus, Patent Document 1 does not disclose adequate measures for suppressing deterioration of the efficiency of a turbomachine due to stirring loss of lubricant oil.

In view of the above, an object of at least one embodiment of the present invention is to provide a turbomachine whereby it is possible to suppress stirring loss of lubricant oil.

Solution to the Problems (1) A turbomachine according to at least one embodiment of the present invention comprises: a rotational shaft; a pair of thrust collars disposed around the rotational shaft; a thrust bearing disposed around the rotational shaft at an axial directional position between the pair of thrust collars; and an oil-drain channel disposed around the rotational shaft, for draining lubricant oil after lubricating a sliding portion between the thrust bearing and the thrust collars. The oil-drain channel includes: an oil-drain port portion for discharging the lubricant oil inside the oil-drain channel downward; and an oil-guide channel portion disposed above the oil-drain port portion and configured to guide the lubricant oil from the sliding portion in a circumferential direction of the rotational shaft to the oil-drain port portion. The oil-guide channel portion has an asymmetric shape with respect to a rotational direction of the rotational shaft, the oil-guide channel portion having a minimum flow-path cross sectional area at a first position on an upstream side in the rotational direction, and a maximum flow-path cross sectional area at a second position on a downstream side of the first position.

With the above configuration (1), the oil-guide channel portion has the minimum flow-path cross-sectional area at the first position on the upstream side in the rotational direction, and the maximum flow-path cross-sectional area at the second position on the downstream side of the first position, thus having an asymmetric shape. Accordingly, the oil draining performance improves compared with a case in which the shape of the oil-guide channel portion is symmetric with respect to the rotational direction of the rotational shaft, and thus the lubricant oil and the outer peripheral surfaces of the thrust collars are less likely to contact each other even in a downstream region of the oil-guide channel portion. Thus, it is possible to suppress mechanical loss of the turbomachine due to stirring of lubricant oil by the thrust collars.

In some embodiments, "the flow-path cross-sectional area" of the oil-guide channel portion refers to the area of a cross section of the oil-guide channel portion along the radial direction of the rotational shaft.

(2) In some embodiments, in the above configuration (1), the oil-guide channel portion is configured such that the flow-path cross sectional area increases from the first position toward the second position along the rotational direction.

With the above configuration (2), the flow path of the oil-guide channel portion widens from the first position on the upstream side toward the second position on the downstream side, with respect to the rotational direction, and thus it is possible to prevent contact between the lubricant oil and the outer peripheral surfaces of the thrust collars effectively in the downstream region of the oil-guide channel portion where the amount of lubricant oil tends to increase. Thus, it is possible to further suppress mechanical loss of the turbomachine due to stirring of lubricant oil by the thrust collars.

(3) In some embodiments, in the above configuration (1) or (2), a flow-path width of the oil-guide channel portion in a radial direction of the rotational shaft is greater at the second position than at the first position.

In the above configuration (3), the radial directional flow-path width of the oil-guide channel portion is not constant, and the radial directional flow-path width at the second position on the downstream side is greater than the radial directional flow-path width at the first position on the upstream side, with respect to the rotational direction. Thus, it is easier to prevent contact between the lubricant oil and the outer peripheral surfaces of the thrust collars in the downstream region of the oil-guide channel portion. Thus, it is possible to effectively suppress mechanical loss of the turbomachine due to stirring of lubricant oil by the thrust collars.

(4) In some embodiments, in the above configuration (3), an outer peripheral edge of the oil-guide channel portion has an arc shape having a center offset from an axial center of the rotational shaft.

With the above configuration (4), the outer peripheral edge of the oil-guide channel portion can be formed into an arc shape by a simple processing using a lathe, for instance. Thus, when implementing the above configuration (3) (the radial directional flow-path width is greater at the second position on the downstream side than at the first position on the upstream side in the rotational direction), it is possible to reduce the producing costs of the turbomachine by improving the workability.

(5) In some embodiments, in the above configuration (4), the center of the arc shape is at a position offset from the axial center at least in a horizontal direction from an upstream region toward a downstream region of the oil-guide channel portion in the rotational direction.

With the above configuration (5), the oil-guide channel portion has a portion (throat portion) at which the radial directional flow-path width is the narrowest, at the upstream side of a vertical plane passing through the center axis of the rotational shaft. The radial directional flow-path width of the oil-guide channel portion gradually increases downstream from the throat portion toward the oil-drain port portion. Thus, while the oil-guide channel portion can be processed simply by using a lathe, for instance, it is possible to effectively prevent contact between the lubricant oil and the outer peripheral surfaces of the thrust collars in the downstream region of the oil-guide channel portion. Thus, it is possible to effectively suppress mechanical loss of the turbomachine due to stirring of lubricant oil by the thrust collars, without sacrificing the workability of the turbomachine.

(6) In some embodiments, in any one of the above configurations (1) to (5), a flow path of the oil-guide channel portion in an axial direction of the rotational shaft is greater at the second position than at the first position.

With the above configuration (6), the axial directional flow-path width of the oil-guide channel portion is not constant, and the axial directional flow-path width at the second position on the downstream side is greater than the axial directional flow-path width at the first position on the upstream side, with respect to the rotational direction. Thus, it is easier to prevent contact between the lubricant oil and the outer peripheral surfaces of the thrust collars in the downstream region of the oil-guide channel portion. Thus, it is possible to effectively suppress mechanical loss of the turbomachine due to stirring of lubricant oil by the thrust collars.

(7) In some embodiments, in any one of the above configurations (1) to (6), a flow-path cross sectional area of the oil-guide channel portion is smaller at a most upstream position in the rotational direction than at a most downstream position in the rotational direction.

With the above configuration (7), it is possible to suppress re-entry of lubricant oil having arrived at the oil-drain port portion to the oil-guide channel portion. Thus, it is possible to reduce the amount of lubricant oil at the oil-guide channel portion, which makes it easier to prevent contact between the lubricant oil and the outer peripheral surfaces of the thrust collars inside the oil-guide channel portion. Thus, it is possible to effectively suppress mechanical loss of the turbomachine due to stirring of lubricant oil by the thrust collars.

(8) In some embodiments, in any one of the above configurations (1) to (7), an outer peripheral edge of the oil-guide channel portion has a shape formed by: a combination of one or more curves; a combination of a plurality of lines; or a combination of one or more lines and one or more curves.

(9) In some embodiments, in any one of the above configurations (1) to (8), the turbomachine further comprises a bearing housing for housing the thrust bearing. The oil-drain channel includes a first oil-drain channel formed by a space surrounded by a first end surface of the thrust bearing and a bearing groove formed on an inner wall surface of the bearing housing facing the first end surface.

With the above configuration (9), the configuration described in the above (1) to (8) is applied to the oil-drain channel (the first oil-drain channel) formed by a space surrounded by the first end surface of the thrust bearing and the bearing groove of the bearing housing. Thus, the oil-draining performance from the first oil-drain channel improves, which makes it easier to prevent contact between the lubricant oil and the outer peripheral surfaces of the thrust collars inside the first oil-drain channel. Thus, it is possible to prevent stirring of lubricant oil by the thrust collars inside the first oil-drain channel, and to suppress mechanical loss of the turbomachine.

(10) In some embodiments, in any one of the above configurations (1) to (9), the turbomachine further comprises an oil deflector disposed so as to face a second end surface of the thrust bearing and an end surface of the thrust collar disposed on a side of the second end surface, the end surface being opposite from a sliding surface between the thrust collar and the thrust bearing. The oil-drain channel includes a second oil-drain channel formed by a space surrounded by the oil deflector, the thrust collar, and the thrust bearing.

With the above configuration (10), the configuration described in the above (1) to (8) is applied to the oil-drain channel (the second oil-drain channel) formed by a space surrounded by the thrust bearing, the thrust collar, and the oil deflector. Thus, the oil-draining performance from the second oil-drain channel improves, which makes it easier to prevent contact between the lubricant oil and the outer peripheral surfaces of the thrust collars inside the second oil-drain channel. Thus, it is possible to prevent stirring of lubricant oil by the thrust collars inside the second oil-drain channel, and to suppress mechanical loss of the turbomachine.

(11) In some embodiments, in any one of the above configurations (1) to (10), the turbomachine comprises: an impeller configured to rotate with the rotational shaft; a working-fluid flow path in which the impeller is disposed and through which a working fluid flows; and a partition wall separating the working-fluid flow path and a bearing space housing the thrust bearing and the pair of thrust collars. The oil-drain channel includes a third oil-drain channel formed by a space surrounded by at least the partition wall.

With the above configuration (11), the configuration described in the above (1) to (8) is applied to the oil-drain channel (the third oil-drain channel) formed by a space surrounded by the partition wall separating the working-fluid channel and the bearing space. Thus, the oil-draining performance from the third oil-drain channel improves, which makes it easier to prevent contact between the lubricant oil and the outer peripheral surfaces of the thrust collars inside the third oil-drain channel. Thus, it is possible to prevent stirring of lubricant oil by the thrust collars inside the third oil-drain channel, and to suppress mechanical loss of the turbomachine.

(12) A turbomachine according to at least one embodiment of the present invention comprises: a rotational shaft; an impeller configured to rotate with the rotational shaft; a working-fluid flow path in which the impeller is disposed and through which a working fluid flows; a pair of thrust collars disposed around the rotational shaft; a thrust bearing disposed around the rotational shaft, at an axial directional position between the pair of thrust collars; a partition wall separating the working-fluid flow path and a bearing space housing the thrust bearing and the pair of thrust collars; and an oil-drain channel disposed around the rotational shaft, for draining lubricant oil after lubricating a sliding portion between the thrust bearing and the thrust collars, at a partition-wall side of the thrust bearing. The partition wall includes an edge portion disposed so as to protrude from a surface of the partition wall on a side of the bearing space toward the thrust bearing, the edge portion extending along a circumferential direction of the rotational shaft. The oil-drain channel is formed by a space surrounded by the edge portion and the surface of the partition wall on the side of the bearing space. The edge portion has a lower region cut off and has a top-bottom asymmetric shape.

With the above configuration (12), the edge portion of the partition wall forming the oil-drain channel has a top-bottom asymmetric shape whose lower region is cut off, which promotes discharge of lubricant oil from the oil-drain port portion forming a lower region of the oil-drain channel. Accordingly, as compared to a case in which the end portion of the partition wall has a top-bottom symmetric shape, lubricant oil and the outer peripheral surfaces of the thrust collars are less likely to make contact with each other inside the oil-drain channel. Thus, it is possible to suppress mechanical loss of the turbomachine due to stirring of lubricant oil by the thrust collars.

The above configuration (12) may be combined with any one of the above (1) to (11).

(13) In some embodiments, in the above configuration (12), the edge portion in the lower region has an inclined surface inclined downward toward the thrust bearing in an axial direction.

With the above configuration (13), the edge portion in the lower region has an inclined surface inclined downward toward the thrust bearing, which further promotes discharge of lubricant oil from the oil-drain port portion forming a lower region of the oil-drain channel. Accordingly, it is possible to prevent contact between lubricant oil and the outer peripheral surfaces of the thrust collars effectively, thus suppressing mechanical loss of the turbomachine due to stirring of lubricant oil by the thrust collars even further.

(14) A turbomachine according to at least one embodiment of the present invention comprises: a rotational shaft; a pair of thrust collars disposed around the rotational shaft; a thrust bearing disposed around the rotational shaft at an axial directional position between the pair of thrust collars; and an oil-drain channel disposed around the rotational shaft, for draining lubricant oil after lubricating a sliding portion between the thrust bearing and the thrust collars. The oil-drain channel includes: an oil-drain port portion for discharging the lubricant oil inside the oil-drain channel downward; and an oil-guide channel portion disposed above the oil-drain port portion and configured to guide the lubricant oil from the sliding portion in a circumferential direction of the rotational shaft to the oil-drain port portion. A relational expression V×S>Q is satisfied, where V is a flow rate of the lubricant oil at each position in the oil-guide channel portion, S is a flow-path cross sectional area S at each position in the oil-guide channel portion, and Q is a supply amount of the lubricant oil to the thrust bearing.

With the above configuration (14), the relational expression V×A>Q is satisfied at each position of the oil-guide channel portion, and thereby it is possible to guide lubricant oil smoothly to the oil-drain port portion via the oil-guide channel portion even if the flow rate Q of lubricant oil is discharged to the oil-guide channel portion from the thrust bearing. Accordingly, thanks to the high oil-draining performance of the oil-guide channel portion, it is possible to prevent contact between lubricant oil and the outer peripheral surfaces of the thrust collars, and to suppress mechanical loss of the turbomachine due to stirring of lubricant oil by the thrust collars.

The above configuration (14) may be combined with any one of the above (1) to (13).

(15) In some embodiments, in any one of the above configurations (1) to (14), the turbomachine is a turbocharger including a turbine and a compressor disposed on either side of the rotational shaft.

With the above configuration (15), it is possible to discharge lubricant oil after lubricating the sliding portion between the thrust bearing and the thrust collars smoothly from the oil-drain channel, and to prevent contact between the lubricant oil and the outer peripheral surfaces of the thrust collars inside the oil-drain channel. Thus, it is possible to suppress mechanical loss of the turbocharger (turbomachine) due to stirring of lubricant oil by the thrust collars.

Advantageous Effects

According to at least one embodiment of the present invention, it is possible to improve the oil draining performance of the oil-drain channel, and to prevent contact between lubricant oil and the outer peripheral surfaces of the thrust collars, thus suppressing mechanical loss of the turbomachine due to stirring of lubricant oil by the thrust collars.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

First, with reference to FIG. 1, a turbocharger will be described briefly as an example of application of a turbomachine according to an embodiment of the present invention.

Figure 1:
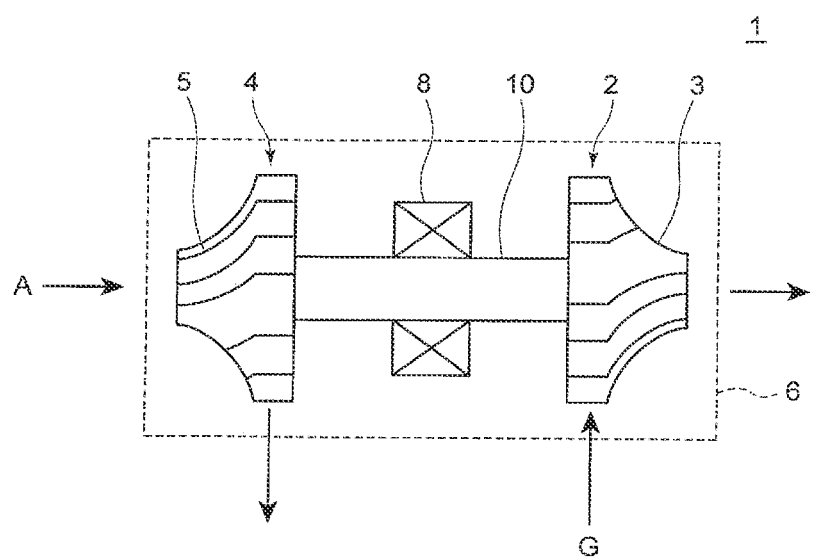
FIG. 1 is a schematic configuration diagram of a turbocharger according to an embodiment.

FIG. 1 is a schematic configuration diagram of a turbocharger according to an embodiment of the present invention.

The turbocharger 1 illustrated in FIG. 1 is not particularly limited and only needs to be a turbocharger for forcedly sending intake air into an internal combustion engine. For instance, the turbocharger may be a turbocharger for an automobile, or a turbocharger for a ship.

In some embodiments, as illustrated in FIG. 1, the turbocharger 1 includes a turbine 2 and a compressor 4 driven by the turbine 2. The turbine 2 is configured to be driven by exhaust gas G from an internal combustion engine (not illustrated). The compressor 4 is configured to be driven by the turbine 2 to compress intake air A flowing into the internal combustion engine.

The turbine 2 includes a rotational shaft 10, and a turbine wheel 3 which is rotatable along with the rotational shaft 10. In this way, when energy of the exhaust gas from the internal combustion engine serving as a high-temperature and high-pressure working fluid is recovered by the turbine wheel 3, the turbine wheel 3 and the rotational shaft 10 rotate integrally.

Further, the rotational shaft 10 of the turbine 2 is supported to a housing 6 via a bearing 8. The rotational shaft 10 is coupled to a compressor wheel 5 of a compressor 4 at the opposite side from the turbine 2 across the bearing 8 in the axial direction. In an embodiment, the bearing 8 includes a thrust bearing 20 described below.

Next, with reference to FIGS. 2 to 11, the configuration of a turbomachine (e.g. turbocharger 1) according to an embodiment of the present invention will be described in detail.

Figure 2:
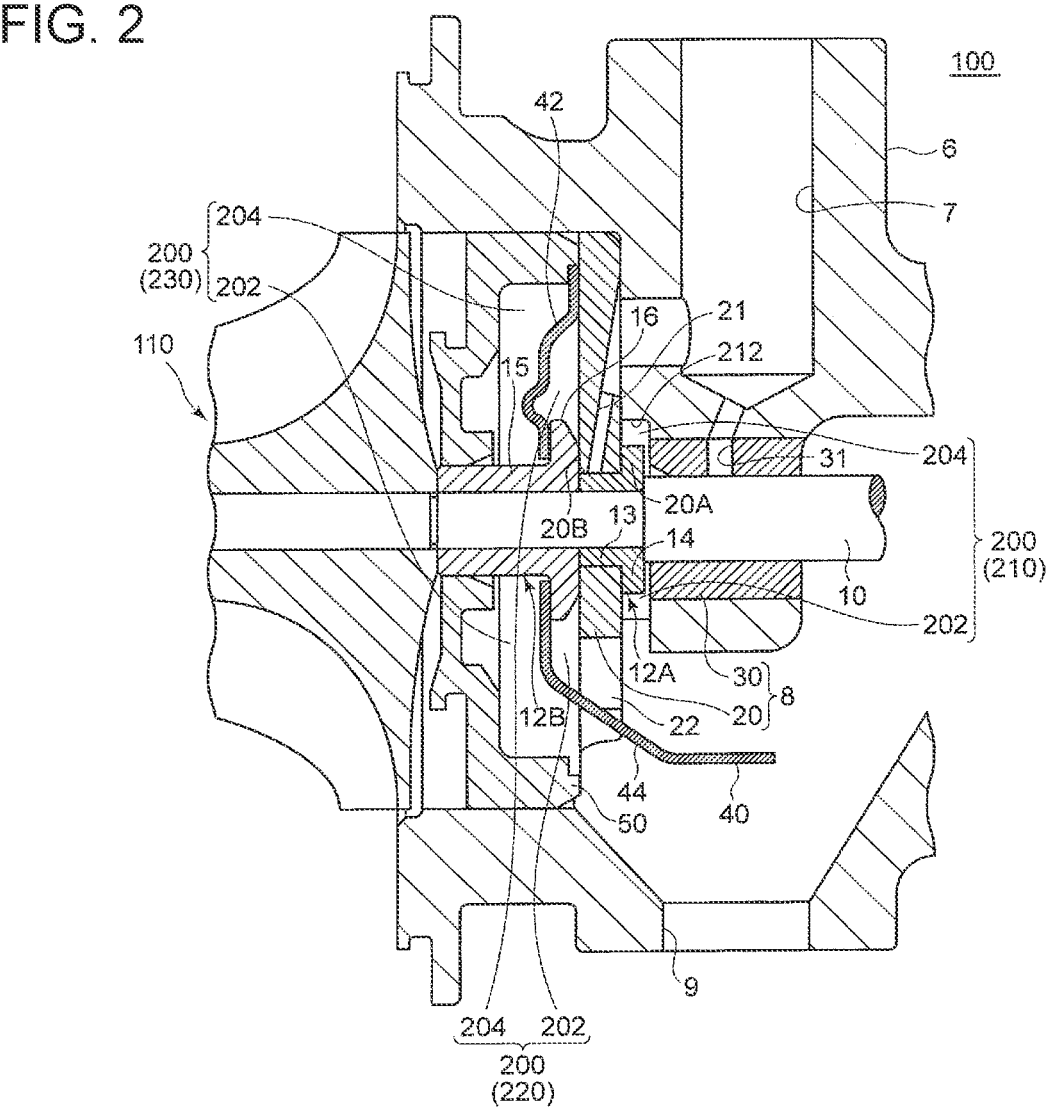
FIG. 2 is a cross-sectional view of an interior structure of a turbomachine according to an embodiment.
Figure 3:
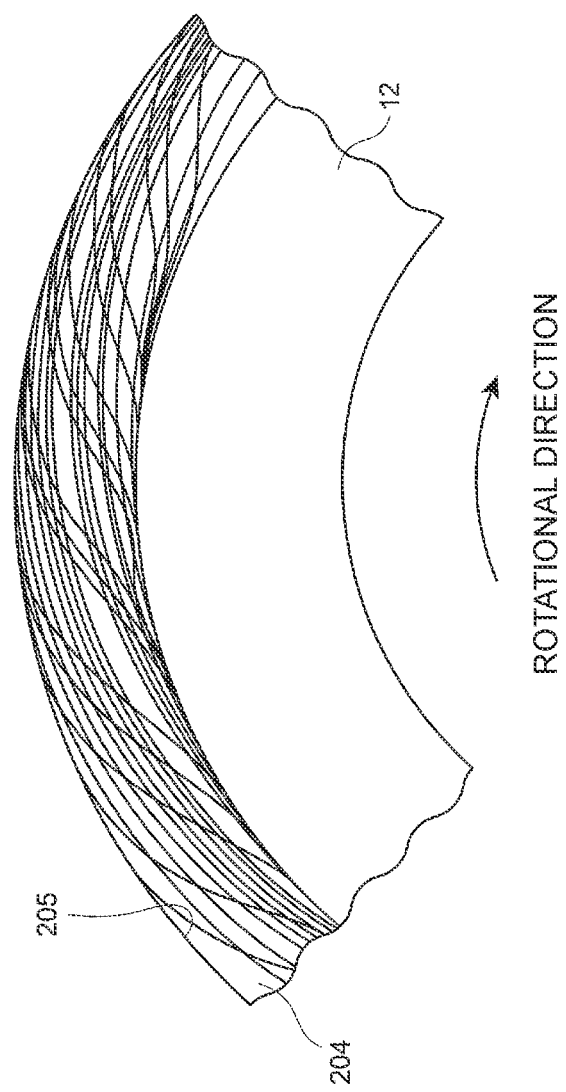
FIG. 3 is a CFD analysis result showing a flow of lubricant oil after lubricating sliding portions between a thrust bearing and thrust collars inside an oil-guide channel portion.
Figure 4A:
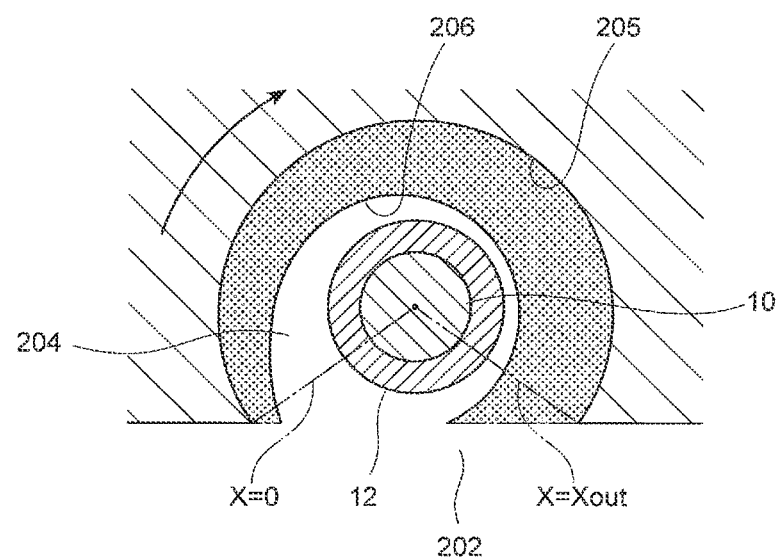
FIGS. 4A and 4B are schematic diagrams for describing distributions of lubricant oil inside an oil-guide channel portion, FIG. 4A showing a distribution of lubricant oil during low-speed rotation of a turbomachine, and FIG. 4B showing a distribution of lubricant oil during high-speed rotation of a turbomachine.
Figure 4B:
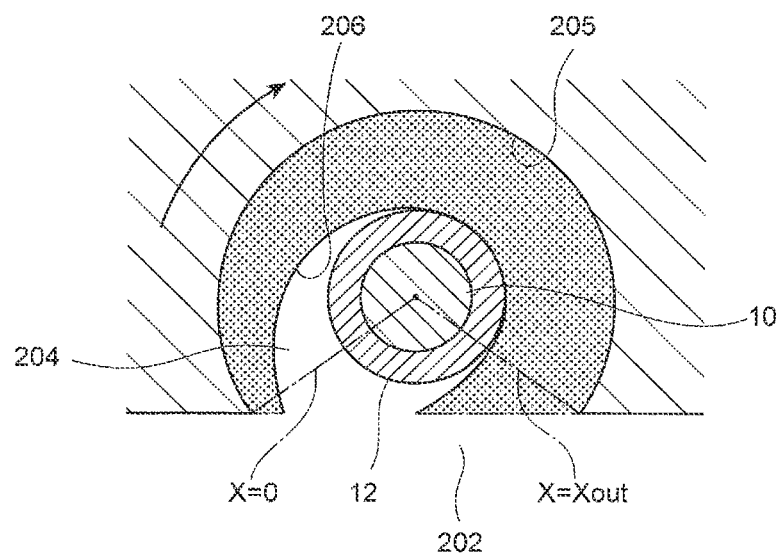
Figure 6:
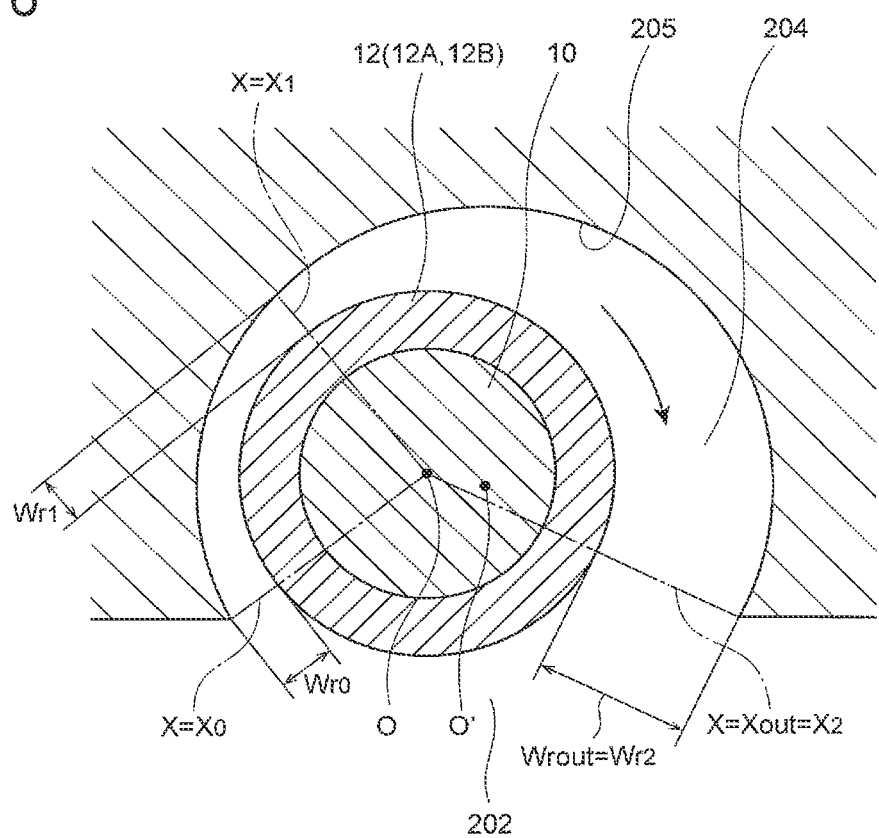
FIG. 6 is a cross-sectional view of an oil-guide channel portion of an oil-drain channel according to an embodiment.
Figure 7:
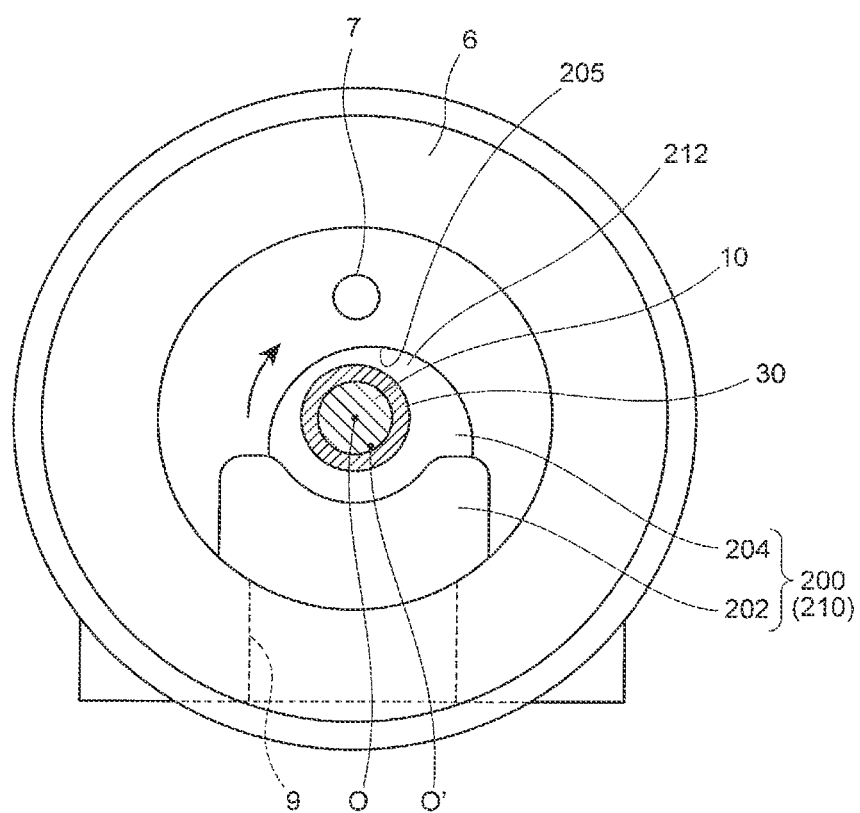
FIG. 7 is a front view of a bearing housing forming the first oil-drain channel according to an embodiment.
Figure 8:
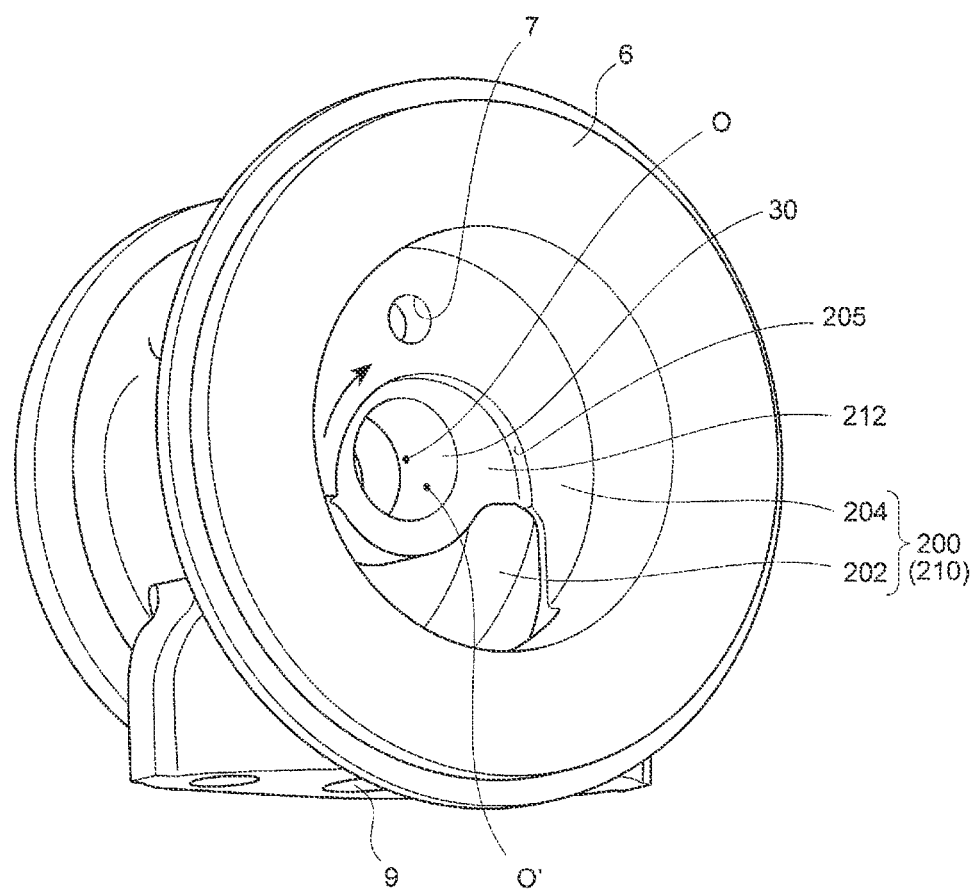
FIG. 8 is a perspective view of the bearing housing depicted in FIG. 7.
Figure 9:
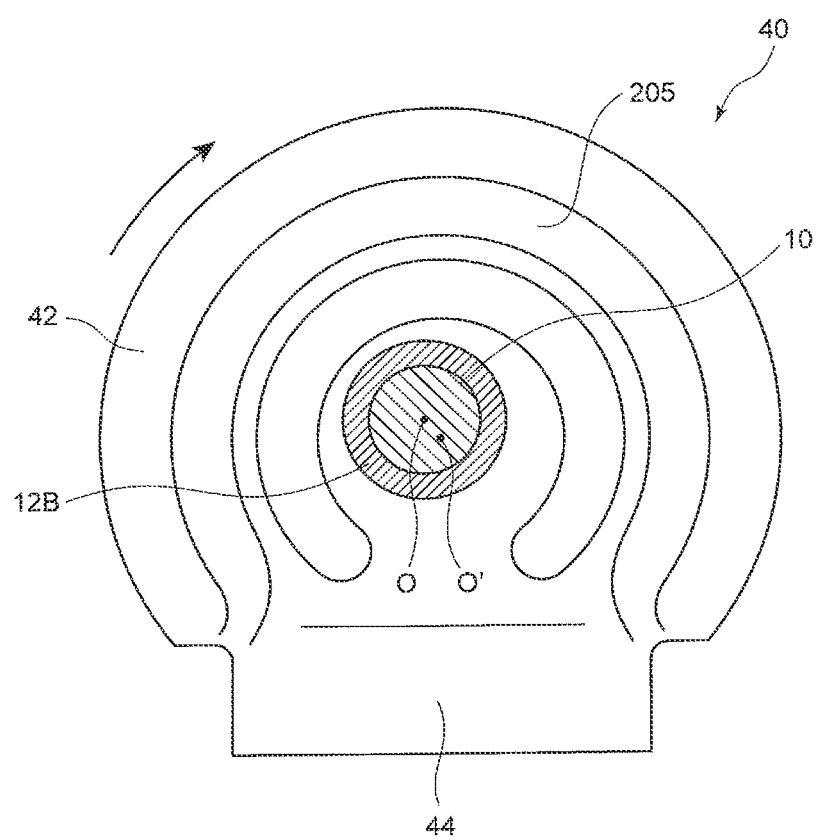
FIG. 9 is a front view of an oil deflector forming the second oil-drain channel according to an embodiment.
Figure 10:
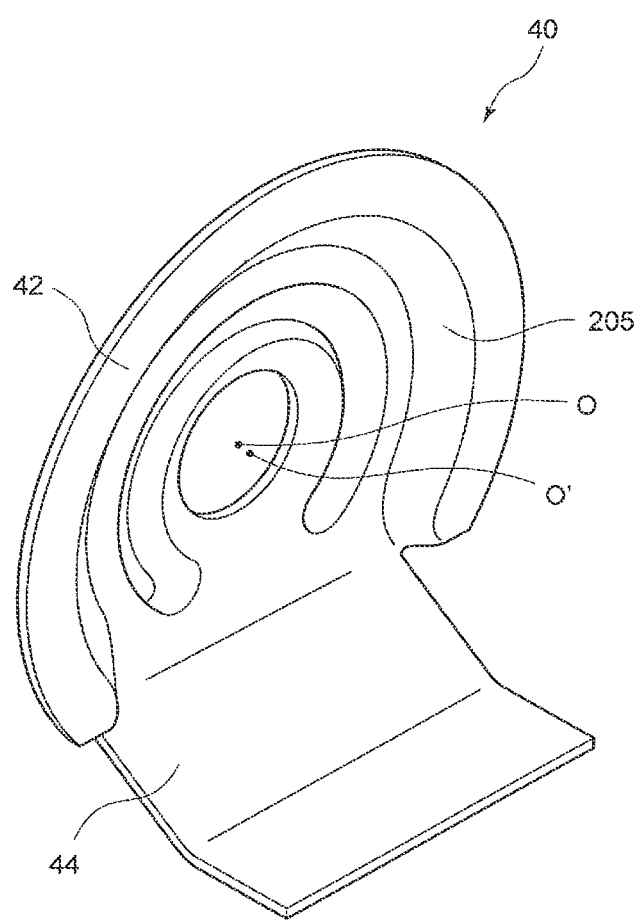
FIG. 10 is a perspective view of the oil deflector depicted in FIG. 9.
Figure 11:
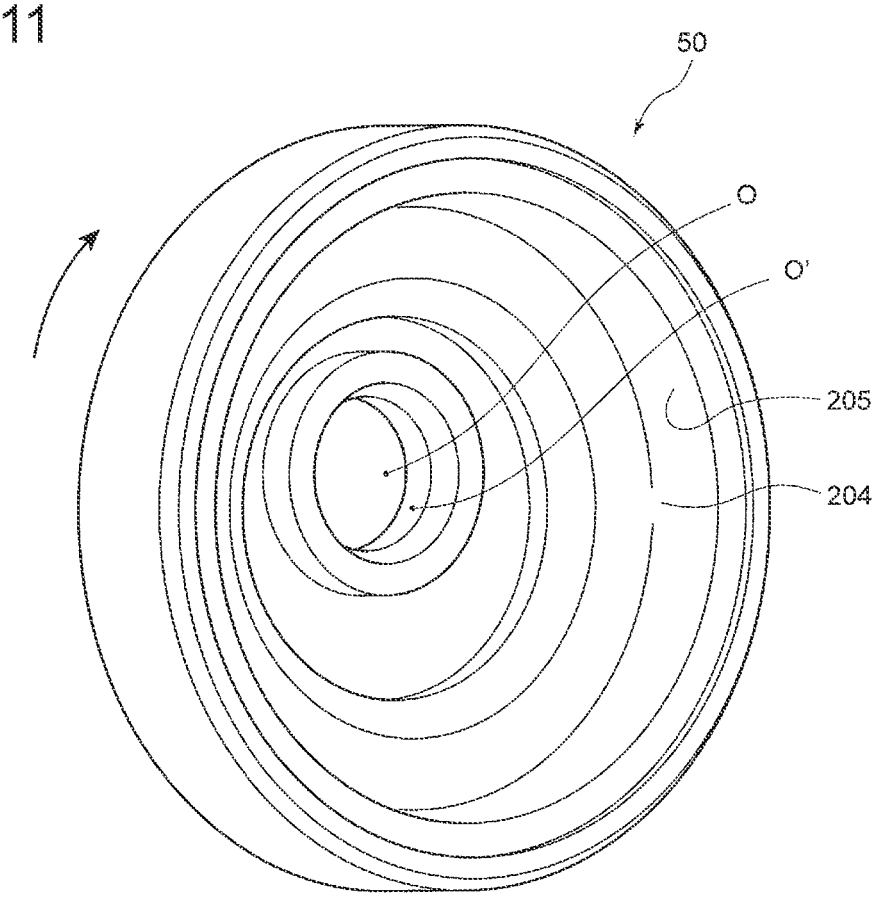
FIG. 11 is a perspective view of a partition wall (insert) forming the third oil-drain channel according to an embodiment.

FIG. 2 is a cross-sectional view of an interior structure of a turbomachine according to an embodiment. FIG. 3 is a CFD analysis result showing a flow of lubricant oil after lubricating sliding portions between a thrust bearing and thrust collars inside an oil-guide channel portion. FIGS. 4A and 4B are schematic diagrams for describing distributions of lubricant oil inside an oil-guide channel portion, FIG. 4A showing a distribution of lubricant oil during low-speed rotation of a turbomachine, and FIG. 4B showing a distribution of lubricant oil during high-speed rotation of a turbomachine. FIGS. 5A to 5E are graphs showing a relationship between a circumferential directional position along the rotational direction of a rotational shaft and a flow-path cross-sectional area inside the oil-guide channel portion. In FIGS. 5A to 5E, x is a circumferential directional position along the rotational direction of the rotational shaft, where $x=0$ indicates a position of an upstream end of the oil-guide channel portion, and $x=X_{out}$ indicates a position of a downstream end of the oil-guide channel portion. FIG. 6 is a cross-sectional view of an oil-guide channel portion of an oil-drain channel according to an embodiment. FIG. 7 is a front view of a bearing housing forming the first oil-drain channel according to an embodiment. FIG. 8 is a perspective view of the bearing housing depicted in FIG. 7. FIG. 9 is a front view of an oil deflector forming the second oil-drain channel according to an embodiment. FIG. 10 is a perspective view of the oil deflector depicted in FIG. 9. FIG. 11 is a partition wall (insert) forming the third oil-drain channel according to an embodiment.

As depicted in FIG. 2, the rotational shaft 10 of the turbomachine 100 is supported rotatably to the housing (bearing housing) 6 via the bearing 8.

In some embodiments, the bearing 8 includes a thrust bearing 20 and a radial bearing 30. The thrust bearing 20 is fixed to the housing 6 while being interposed between an insert (partition wall) 50 and the housing 6. The thrust bearing 20 is disposed around the rotational shaft 10 at an axial directional position between a pair of thrust collars 12 (12A, 12B) disposed on the outer periphery of the rotational shaft 10. The thrust collar 12A is disposed on the side of the first end surface 20A of the thrust bearing 20, and the thrust collar 12B is disposed on the side of the second end surface 20B of the thrust bearing 20.

In the embodiment illustrated in FIG. 2, the thrust collar (thrust ring) 12A includes a sleeve portion 13, and a flange portion 14 disposed on an end portion of the sleeve portion 13 so as to protrude from the outer peripheral surface of the sleeve portion 13. The sleeve portion 13 of the thrust collar 12A is inserted into an insertion hole formed in the thrust bearing 20. Further, the flange portion 14 of the thrust collar 12A is configured to make slide contact with the first end surface 20A of the thrust bearing 20.

The thrust collar 12B includes a sleeve portion 15, and a flange portion 16 disposed on an end portion of the sleeve portion 15 so as to protrude from the outer peripheral surface of the sleeve portion 15. The sleeve portion 15 of the thrust collar 12B is inserted into an insertion hole formed in an oil deflector 40 and an insert (partition wall) 50 described below. Further, the flange portion 16 of the thrust collar 12B is configured to make slide contact with the second end surface 20B of the thrust bearing 20.

In some embodiments, the bearing housing 6 includes an oil-supply channel 7, through which lubricant oil is supplied to the thrust bearing 20 and the radial bearing 30. The thrust bearing 20 and the radial bearing 30 have respective oil-supply holes 21, 31 communicating with the oil-supply channel 37.

Accordingly, lubricant oil is supplied from the oil-supply channel 7 to a sliding portion between the thrust bearing 20 and the thrust collars (12A, 12B) via the oil-supply hole 21 of the thrust bearing 20. Similarly, lubricant oil is supplied from the oil-supply channel 7 to a sliding portion between the rotational shaft 10 and the radial bearing 30 via the oil-supply hole 31 of the radial bearing 30.

Further, the turbomachine 100 includes an oil-drain channel 200 disposed around the rotational shaft 10, for discharging lubricant oil after lubricating the sliding portions between the thrust bearing 20 and the thrust collars 12 (12A, 12B).

In some embodiments, the oil-drain channel 200 includes the first oil-drain channel 210 disposed on the side of the first end surface 20A of the thrust bearing 20, and at least one of the second oil-drain channel 220 or the third oil-drain channel 230 disposed on the side of the second end surface 20B of the thrust bearing 20. In the embodiment depicted in FIG. 2, the oil-drain channel 200 includes the first oil-drain channel 210, the second oil-drain channel 220, and the third oil-drain channel 230.

The first oil-drain channel 210 is formed by a space surrounded by a bearing groove 212 formed on an inner wall surface of the bearing housing 6 that houses the thrust bearing 20, and the first end surface 20A of the thrust bearing 20.

The second oil-drain channel 220 is formed by a space surrounded by the oil deflector 40, the thrust collar 12B, and the second end surface 20B of the thrust bearing 20. The oil deflector 40 is a member for guiding lubricant oil discharged from the thrust bearing 20 to an oil-drain port 9 disposed below the bearing housing 6, and is formed by processing sheet metal in an embodiment. The oil deflector 40 is disposed so as to face the second end surface 20B of the thrust bearing 20 and an end surface, opposite from the thrust bearing 20, of the flange portion 16 of the thrust collar 12B. Further, the oil deflector 40 includes a disc portion 42 facing the second end surface 20B of the thrust bearing 20 and a tongue portion 44 protruding toward the thrust bearing 20 from below the disc portion 42. Accordingly, the disc portion 42 receives lubricant oil that scatters from the sliding portion between the second end surface 20B of the thrust bearing 20 and the thrust collar 12B and guides the lubricant oil to the tongue portion 44, where the lubricant oil flows downward along the tongue portion 44 to be discharged through clearance between the tongue portion 44 and an opening 22 disposed on a lower part of the thrust bearing 20.

The third oil-drain channel 230 is formed by a space surrounded at least by an insert 50. Further, the insert 50 is a partition wall separating a bearing space inside the bearing housing 6 and a working fluid channel in which an impeller 110 configured to rotate with the rotational shaft 10 is provided. The insert 50 prevents lubricant oil from flowing out from the bearing space into the working fluid channel. Further, the insert 50 also has a function to retain the oil deflector 40 by pressing the oil deflector 40 against the second end surface 20B of the thrust bearing 20.

Each oil-drain channel 200 (210, 220, 230) includes an oil-drain port portion 202 for discharging lubricant oil inside the oil-drain channel 200 downward, and an oil-guide channel portion 204 disposed above the oil-drain port portion 202. The oil-guide channel portion 204 is configured to guide lubricant oil from the sliding portions between the thrust bearing 20 and the thrust collars 12 (12A, 12B) in the circumferential direction and to guide the lubricant oil to the oil-drain port portion 202.

Specifically, each oil-drain channel 200 (210, 220, 230) is a substantially annular flow channel extending along the circumferential direction of the rotational shaft 10. The lower region of the substantially annular flow channel is the oil-drain port portion 202, and the upper region of the substantially annular flow channel is the oil-guide channel portion 204.

The present inventors conducted CFD analyses on the flow of lubricant oil after lubricating the sliding portions between the thrust bearing 20 and the thrust collars (12A, 12B) inside the oil-drain channel 200 of the above configuration.

As a result, as depicted in FIG. 3, it was found that the lubricant oil after lubricating the sliding portions between the thrust bearing 20 and the thrust collars 12 (12A, 12B) has a swirl component along the rotational direction of the rotational shaft 10 inside the oil-drain channel 200. Further, it was found that lubricant oil with a swirl component gets attracted toward an outer peripheral wall 205 of the oil-guide channel portion 204 disposed above the oil-drain port portion 202 of the oil-drain channel 200, inside the oil-guide channel portion 204, to flow along the outer peripheral wall 205 of the oil-guide channel portion 204 toward the oil-drain port portion 202.

Accordingly, lubricant oil flows along the outer peripheral wall 205 of the oil-guide channel portion 204 of the oil-drain channel 200 inside the oil-guide channel portion 204, and thus, as depicted in FIGS. 4A and 4B, the distribution of lubricant oil inside the oil-guide channel portion 204 changes in accordance with the operational state (or the amount of supply of lubricant oil) of the turbomachine 100.

Specifically, as depicted in FIG. 4A, during low-speed rotation of the turbomachine 100 (or when the amount of supply of lubricant oil is small), a gas-liquid boundary surface 206 of lubricant oil flowing along the outer peripheral wall 205 of the oil-guide channel portion 204 is disposed outside the outer peripheral surfaces of the thrust collars 12 (12A, 12B) in the radial direction, and thereby the lubricant oil and the outer peripheral surfaces of the thrust collars 12 (12A, 12B) are less likely to make direct contact with each other.

However, with an increase in the rotation speed of the turbomachine 100 (or in the amount of supply of lubricant oil), the amount of lubricant oil inside the oil-guide channel portion 204 increases, so that the gas-liquid boundary surface 206 moves inward in the radial direction inside the oil-guide channel portion 204, as depicted in FIG. 4B. Thus, there is a risk of contact between the lubricant oil and the outer peripheral surfaces of the thrust collars 12 (12A, 12B).

Lubricant oil scatters radially from the sliding portions between the thrust bearing 20 and the thrust collars 12 (12A, 12B), along a tangent direction at the outer peripheral edge of the sliding portions, hits the outer peripheral wall 205 of the oil-guide channel portion 204, and flows in the circumferential direction along the outer peripheral wall 205. Thus, as depicted in FIGS. 4A and 4B, the amount of lubricant oil inside the oil-guide channel portion 204 tends to increase from the upstream side toward the downstream side, and the oil-film thickness of lubricant oil increases from the upstream end (circumferential directional position of x=0) toward the downstream end (circumferential directional position of $x=X_{out}$) of the oil guide channel portion 204. Thus, during high-speed rotation of the turbomachine 100, it is the downstream region in the oil-guide channel portion 204 where contact is likely to occur between the outer peripheral surfaces of the lubricant oil and the thrust collars 12 (12A, 12B).

The distributions shown in FIGS. 4A and 4B are merely examples for describing the distribution trend of lubricant oil, and the lubricant oil may form different distributions from those in FIGS. 4A and 4B depending on the flow rate of drain lubricant oil from the oil-drain port portion 202 below the oil-guide channel portion 204.

In some embodiments, the oil-guide channel portion 204 has an asymmetric shape with respect to the rotational direction of the rotational shaft 10, to reduce the risk of contact between the lubricant oil and the thrust collars 12 (12A, 12B) inside the oil-guide channel portion 204. Specifically, as depicted in FIGS. 5A to 5E, the oil-guide channel portion 204 has the minimum flow-path cross-sectional area $S_{min}$ at the first position ($x=x_1$) on the upstream side in the rotational direction of the rotational shaft 10, and the maximum flow-path cross-sectional area $S_{max}$ at the second position ($x=x_2$) on the downstream side of the first position.

Accordingly, the oil draining performance improves compared with a case in which the shape of the oil-guide channel portion 204 is symmetric with respect to the rotational direction of the rotational shaft 10, and thus the lubricant oil and the outer peripheral surfaces of the thrust collars 12 (12A, 12B) are less likely to contact each other in a downstream region of the oil-guide channel portion 204. Thus, it is possible to further suppress mechanical loss of the turbomachine 100 due to stirring of lubricant oil by the thrust collars 12 (12A, 12B).

In some embodiments, as depicted in FIGS. 5A to 5E, the oil-guide channel portion 204 has a flow-path cross-sectional area that increases from $S_{min}$ to $S_{max}$ from the first position ($x=x_1$) to the second position ($x=x_2$) along the rotational direction of the rotational shaft 10.

In this case, the flow path of the oil-guide channel portion 204 widens from the first position ($x=x_1$) on the upstream side toward the second position ($x=x_2$) on the downstream side, and thus it is possible to prevent contact between the lubricant oil and the thrust collars 12 (12A, 12B) effectively in the downstream region of the oil-guide channel portion 204 where the amount of lubricant oil tends to increase.

Further, in some embodiments, as depicted in FIGS. 5A to 5E, the flow-path cross-sectional area of the oil-guide channel portion 204 at the most upstream position (x=0) in the rotational direction is smaller than the flow-path cross-sectional area of the oil-guide channel portion 204 at the most downstream position ($x=X_{out}$) in the rotational direction.

Accordingly, it is possible to suppress re-entry of lubricant oil having arrived at the oil-drain port portion 202 to the oil-guide channel portion 204. Thus, it is possible to reduce the amount of lubricant oil at the oil-guide channel portion 204, which makes it easier to prevent contact between the lubricant oil and the thrust collars 12 (12A, 12B) inside the oil-guide channel portion 204.

Figure 5A:
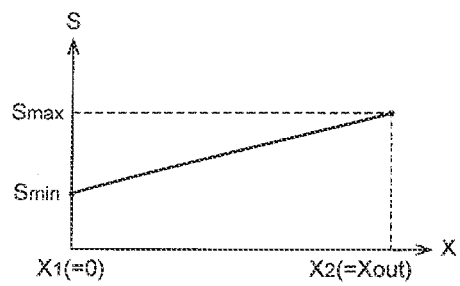
FIGS. 5A to 5E are graphs showing a relationship between a circumferential directional position along the rotational direction of a rotational shaft and a flow-path cross-sectional area inside an oil-guide channel portion, for a turbomachine according to an embodiment.
Figure 5B:
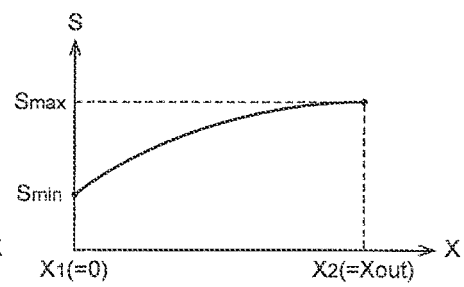

In the illustrative embodiment depicted in FIGS. 5A and 5B, the flow-path cross-sectional area of the oil-guide channel portion 204 increases monotonically and continuously from the upstream end (x=0) to the downstream end ($x=X_{out}$) of the oil-guide channel portion 204. Further, the change in the flow-path cross-sectional area of the oil-guide channel portion 204 may be linear as depicted in FIG. 5A, or non-linear as in FIG. 5B.

Figure 5C:
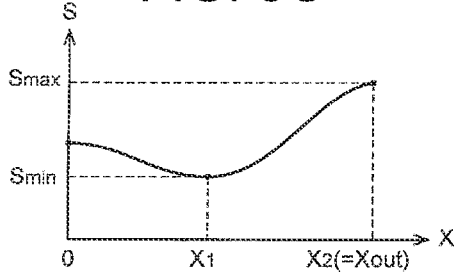
Figure 5D:
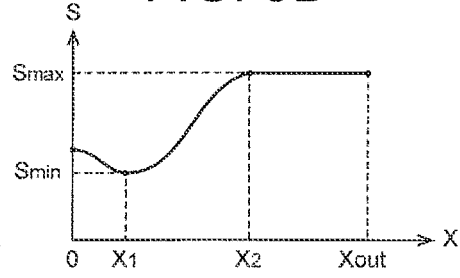

Further, in the illustrative embodiment depicted in FIGS. 5C and 5D, the flow-path cross-sectional area of the oil-guide channel portion 204 decreases from the upstream end (x=0) of the oil-guide channel portion 204 to reach the minimum flow-path cross-sectional area $S_{min}$ at the position ($x=x_1$) midway the oil-guide channel portion 204, and then increases to reach the maximum flow-path cross-sectional area $S_{max}$ at the second position ($x=x_2$) in the end. As depicted in FIG. 5C, the increasing trend of the flow-path cross-sectional area of the oil-guide channel portion 204 from the first position to the second position may continue to the downstream end ($x=X_{out}$) of the oil-guide channel portion 204. Alternatively, as depicted in FIG. 5D, the increasing trend of the flow-path cross-sectional area of the oil-guide channel portion 204 from the first position to the second position may end at the second position ($x=x_2<X_{out}$) before the downstream end ($x=X_{out}$) of the oil-guide channel portion 204, and the flow-path cross-sectional area of the oil-guide channel portion 204 may be maintained constant at the maximum flow-path cross-sectional area $S_{max}$ in the range $x_2 \leq x \leq X_{out}$. While the change in the flow-path cross-sectional area of the oil-guide channel portion 204 is non-linear in the examples depicted in FIGS. 5C and 5D, the change in the flow-path cross-sectional area of the oil-guide channel portion 204 may be linear.

Figure 5E:
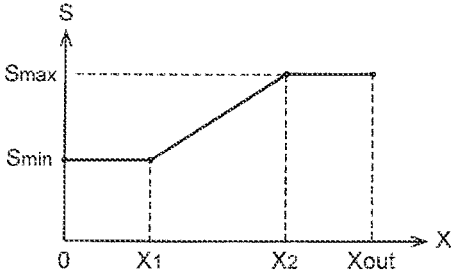

Further, in the embodiment depicted in FIG. 5E, the flow-path cross-sectional area of the oil-guide channel portion 204 is constant at the minimum flow-path cross-sectional area $S_m$ n in the range from the upstream end (x=0) to the first position (x=$x_1$) of the oil-guide channel portion 204, and then the flow-path cross-sectional area of the oil-guide channel portion 204 increases monotonically to the maximum flow-path cross-sectional area $S_{max}$ in the range $x_1 \le x \le x_2$. Then, the flow-path cross-sectional area of the oil-guide channel portion 204 stops to increase, and stays constant at the maximum flow-path cross-sectional area $S_{max}$ in the range of $x_2 \le x \le X_{out}$. While the change in the flow-path cross-sectional area of the oil-guide channel portion 204 is linear in the example depicted in FIG. 5E, the change in the flow-path cross-sectional area of the oil-guide channel portion 204 may be non-linear.

In some embodiments, as depicted in FIG. 6, the flow-path width $W_r$ of the oil-guide channel portion 204 in the radial direction of the rotational shaft 10 is larger at the second position $x_2$ than at the first position $x_1$.

In this case, the radial directional flow-path width $W_r$ of the oil-guide channel portion 204 is not constant, and the radial directional flow-path width $W_{r2}$ at the second position $x=x_2$ on the downstream side is greater than the radial directional flow-path width $W_{r1}$ at the first position $x=x_1$ on the upstream side in the rotational direction. Thus, it is easier to prevent contact between the lubricant oil and the thrust collars 12 (12A, 12B) in the downstream region of the oil-guide channel portion 204.

In the illustrative embodiment depicted in FIG. 6, the radial directional flow-path width $W_r$ of the oil-guide channel portion 204 reaches the minimum value $W_{r1}$ at the first position $x=x_1$ that exists between the upstream end (x=0) and the downstream end (x=$X_{out}$) of the oil-guide channel portion 204. Further, the radial directional flow-path width $W_r$ of the oil-guide channel portion 204 reaches the maximum value $W_{r2}$ at the second position $x=x_2$ that exists at the downstream end (x=$X_{out}$).

In some embodiments, as depicted in FIG. 6, the outer peripheral edge (outer peripheral wall 205) of the oil-guide channel portion 204 has an arc shape with its center O' positioned offset from the axial center O of the rotational shaft 10.

In this case, the outer peripheral edge (outer peripheral wall 205) of the oil-guide channel portion 204 can be formed by a simple processing using a lathe, for instance. Thus, when implementing the above configuration for the oil-guide channel portion 204 (the radial directional flow-path width $W_r$ is greater at the second position $x_2$ on the downstream side than at the first position $x_1$ on the upstream side in the rotational direction), it is possible to reduce the producing costs of the turbomachine 100 by improving the workability.

Further, in some embodiments, as depicted in FIG. 6, the arc center O' of the outer peripheral edge (outer peripheral wall 205) of the oil-guide channel portion 204 exists in a position offset from the axial center O of the rotational shaft 10 at least in the horizontal direction from the upstream region toward the downstream region of the oil-guide channel portion 204 in the rotational direction (arrow direction in the drawing) of the rotational shaft 10. Specifically, the horizontal directional position of the arc center O' of the outer peripheral edge (outer peripheral wall 205) of the oil-guide channel portion 204 is offset from the horizontal directional position of the axial center O of the rotational shaft 10 so that the radial directional flow-path width of the oil-guide channel portion 204 is greater at the downstream side than at the upstream side with respect to the rotational direction.

In this case, the oil-guide channel portion 204 has a portion (throat portion) at which the radial directional flow-path width $W_r$ is the narrowest, at the upstream side of a vertical plane passing through the center axis of the rotational shaft 10. In the example depicted in FIG. 6, the radial directional flow-path width $W_r$ is the narrowest. The radial directional flow-path width $W_r$ of the oil-guide channel portion 204 gradually increases downstream from the throat portion (x=$x_1$) toward the oil-drain port portion 202. Thus, while the oil-guide channel portion 204 can be processed simply by using a lathe, for instance, it is possible to effectively prevent contact between the lubricant oil and the thrust collars 12 (12A, 12B) in the downstream region of the oil-guide channel portion 204.

Further, in the illustrative embodiment depicted in FIG. 6, the arc center O' of the outer peripheral edge (outer peripheral wall 205) of the oil-guide channel portion 204 is offset downward from the axial center O of the rotational shaft 10 not only in the horizontal direction but also in the vertical direction.

In some embodiments, the configuration of the oil-guide channel portion 204 depicted in FIG. 6 is applied to the oil-drain channel 200 (the first oil-guide channel portion 210 depicted in FIG. 2) formed by a space surrounded by the bearing groove 212 of the bearing housing 6 and the first end surface 20A of the thrust bearing 20.

Specifically, as depicted in FIGS. 7 and 8, the outer peripheral edge (outer peripheral wall 205) of the oil-guide channel portion 204 of the first oil-drain channel 210 has an arc shape with its center O' positioned offset from the axial center O of the rotational shaft 10. Further, the arc center O' of the outer peripheral edge (outer peripheral wall 205) of the oil-guide channel portion 204 of the first oil-drain channel 210 exists in a position offset from the axial center O of the rotational shaft 10 at least in the horizontal direction from the upstream region toward the downstream region of the oil-guide channel portion 204 in the rotational direction (arrow direction in the drawing) of the rotational shaft 10. In the example depicted in FIGS. 7 and 8, the arc center O' of the outer peripheral edge (outer peripheral wall 205) of the oil-guide channel portion 204 of the first oil-drain channel 210 is offset downward from the axial center O of the rotational shaft 10 not only in the horizontal direction but also in the vertical direction.

In some embodiments, the configuration of the oil-guide channel portion 204 depicted in FIG. 6 is applied to the oil-drain channel 200 (the second oil-guide channel portion 220 depicted in FIG. 2) formed by a space surrounded by the oil deflector 40, the thrust collar 12B, and the second end surface 20B of the thrust bearing 20.

Specifically, as depicted in FIGS. 9 and 10, the outer peripheral edge (outer peripheral wall 205) of the oil-guide channel portion 204 of the second oil-drain channel 220 has an arc shape with its center O' positioned offset from the axial center O of the rotational shaft 10. Further, the arc center O' of the outer peripheral edge (outer peripheral wall 205) of the oil-guide channel portion 204 of the second oil-drain channel 220 exists in a position offset from the axial center O of the rotational shaft 10 at least in the horizontal direction from the upstream region toward the downstream region of the oil-guide channel portion 204 in the rotational direction (arrow direction in the drawing) of the rotational shaft 10. In the example depicted in FIGS. 9 and 10, the arc center O' of the outer peripheral edge (outer peripheral wall 205) of the oil-guide channel portion 204 of the second oil-guide channel portion 220 is offset downward from the axial center O of the rotational shaft 10 not only in the horizontal direction but also in the vertical direction.

In some embodiments, the configuration of the oil-guide channel portion 204 depicted in FIG. 6 is applied to the oil-drain channel 200 (the third oil-guide channel portion 230 depicted in FIG. 2) formed by a space surrounded by the partition wall (insert) 50 that separates the working-fluid flow path and the bearing space.

Specifically, as depicted in FIG. 11, the outer peripheral edge (outer peripheral wall 205) of the oil-guide channel portion 204 of the third oil-drain channel 230 has an arc shape with its center O' positioned offset from the axial center O of the rotational shaft 10. Further, the arc center O' of the outer peripheral edge (outer peripheral wall 205) of the oil-guide channel portion 204 of the second oil-drain channel 220 exists in a position offset from the axial center O of the rotational shaft 10 at least in the horizontal direction from the upstream region toward the downstream region of the oil-guide channel portion 204 in the rotational direction (arrow direction in the drawing) of the rotational shaft 10. In the example depicted in FIG. 11, the arc center O' of the outer peripheral edge (outer peripheral wall 205) of the oil-guide channel portion 204 of the third oil-guide channel portion 230 is offset downward from the axial center O of the rotational shaft 10 not only in the horizontal direction but also in the vertical direction.

In another embodiment, unlike the embodiment depicted in FIG. 6, the outer peripheral edge (outer peripheral wall 205) of the oil-guide channel portion 204 may not have an arc shape with its center O' positioned offset in the horizontal direction from the axial center O of the rotational shaft 10.

Figure 12:
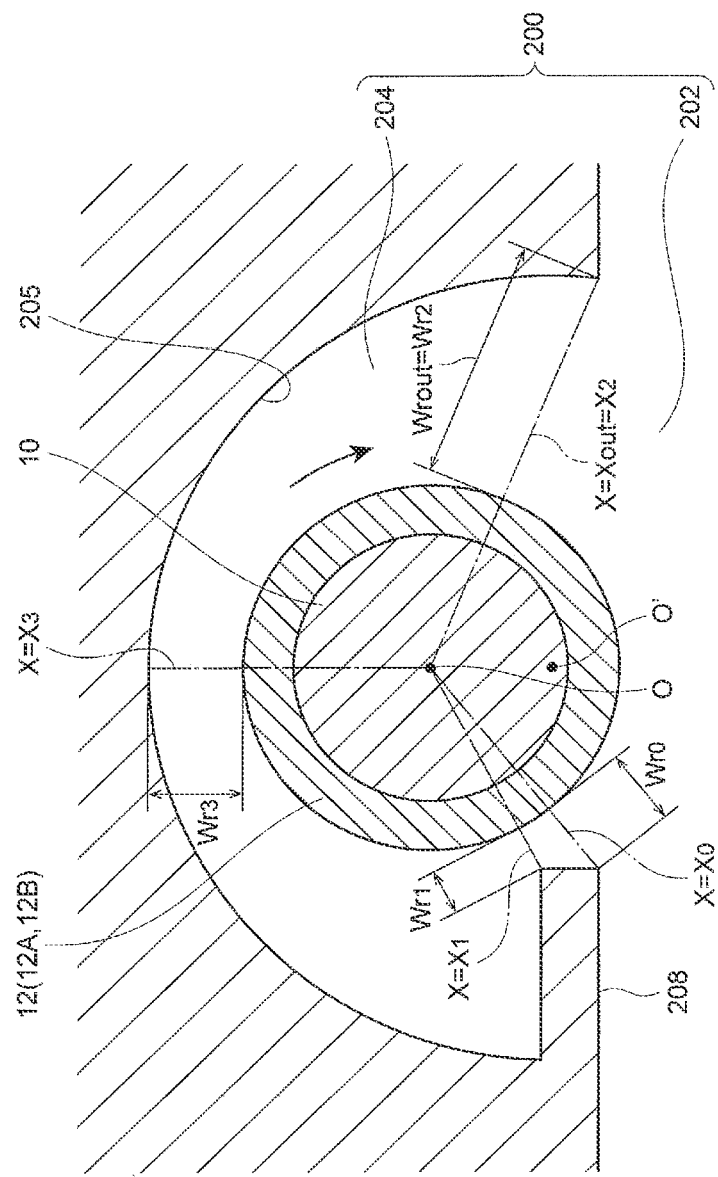
FIG. 12 is a cross-sectional view showing the shape of an oil-guide channel portion according to an embodiment.
Figure 13:
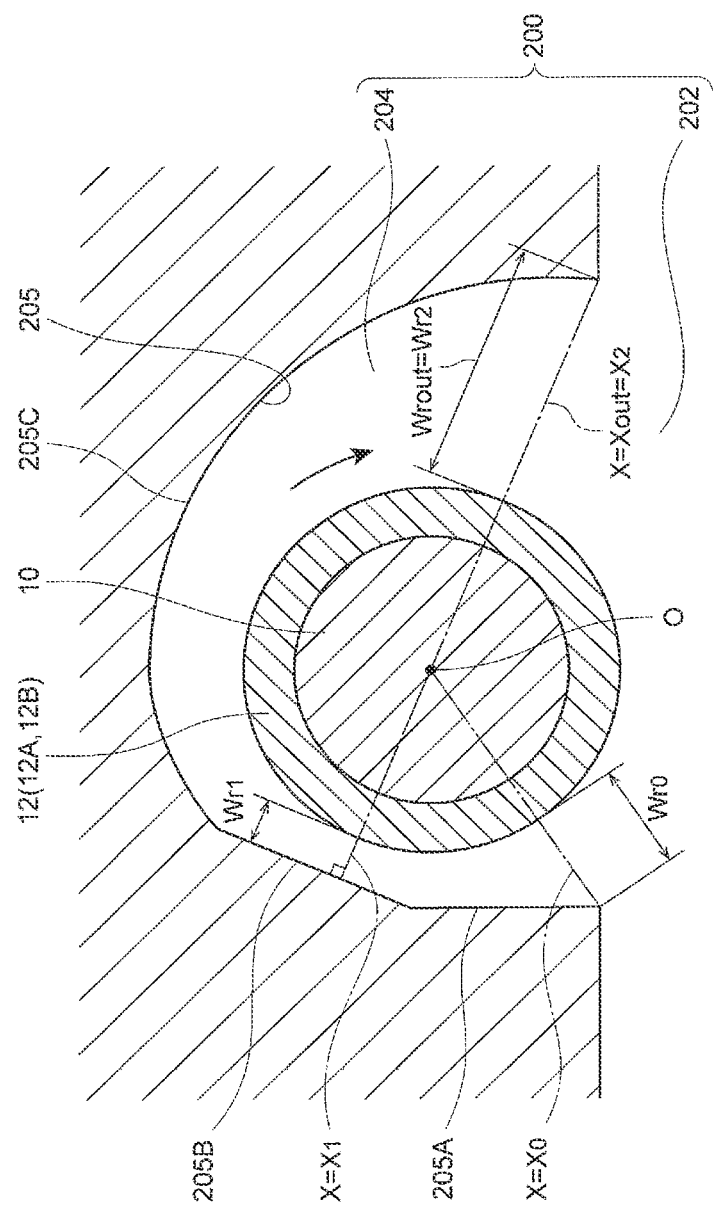
FIG. 13 is a cross-sectional view showing the shape of an oil-guide channel portion according to an embodiment.

FIG. 12 is a cross-sectional view showing the shape of an oil-guide channel portion according to another embodiment. FIG. 13 is a cross-sectional view showing the shape of an oil-guide channel portion according to yet another embodiment.

In the embodiment depicted in FIG. 12, the outer peripheral wall 205 of the oil-guide channel portion 204 has a protruding portion 208 protruding in the horizontal direction toward the rotational shaft 10 at the upstream end ($x=x_0$) of the oil-guide channel portion 204. The outer peripheral wall 205 of the oil-guide channel portion 204 excluding the protruding portion 208 has an arc shape with its center O' positioned offset downward from the axial center O of the rotational shaft 10. The protruding amount of the protruding portion 208 is determined so that the radial directional flow-path width $W_{r1}$ of the oil-guide channel portion 204 between an upper corner portion of the tip of the protruding portion 208 and the outer peripheral surfaces of the thrust collars 12 (12A, 12B) reaches its minimum at the protruding portion 208. Specifically, a relationship $W_{r1} < W_{r0} < W_{r3} < W_{rout} = W_{r2}$ is satisfied, where $W_{r0}$ is the radial directional flow-path width of the oil-guide channel portion 204 at the inlet end (x=0) of the oil-guide channel portion 204, $W_{rout}$ (=$W_{r2}$) is the radial directional flow-path width of the oil-guide channel portion 204 at the outlet end ($x=X_{out}=x_2$) of the oil-guide channel portion 204, and $W_{r3}$ is the radial directional flow-path width of the oil-guide channel portion 204 at a circumferential directional position ($x=x_3$) corresponding to a line extended vertically upward from the axial center O of the rotational shaft 10. As described above, with the protruding portion 208 provided for the outer peripheral wall 205 of the oil-guide channel portion 204, the flow-path cross-sectional area of the oil-guide channel portion 204 at the most upstream position (x=0) in the rotational direction is smaller than the flow-path cross-sectional area of the oil-guide channel portion 204 at the most downstream position ($x=X_{out}$) in the rotational direction. Accordingly, it is possible to suppress re-entry of lubricant oil having arrived at the oil-drain port portion 202 to the oil-guide channel portion 204.

Further, in another embodiment, the outer peripheral wall 205 of the oil-guide channel portion 204 is formed by: a combination of one or more curves; a combination of a plurality of lines; or a combination of one or more lines and one or more curves. In the illustrative embodiment depicted in FIG. 13, the outer peripheral wall 205 of the oil-guide channel portion 204 is formed by a combination of a linear portion 205A, a linear portion 205B, and a curve portion 205C, in this order from the upstream side in the rotational direction (arrow direction in the drawing) of the rotational shaft.

Further, in some embodiments, instead of, or in addition to the configuration depicted in FIG. 6 where the radial directional flow-path width of the oil-guide channel portion 204 has a variation, the axial directional flow-path width of the oil-guide channel portion 204 has a variation. Next, with reference to FIGS. 14 to 16, a configuration of the oil-guide channel portion 204 having an axial directional flow-path width with a variation will be described.

Figure 14:
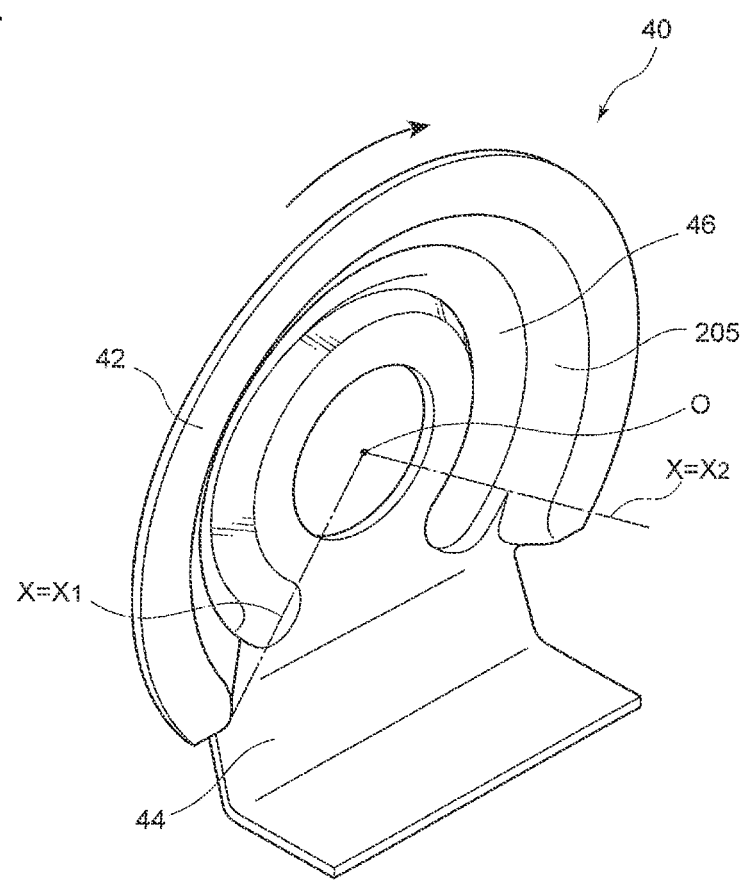
FIG. 14 is a perspective view of an oil deflector forming the second oil-drain channel according to an embodiment.
Figure 15:
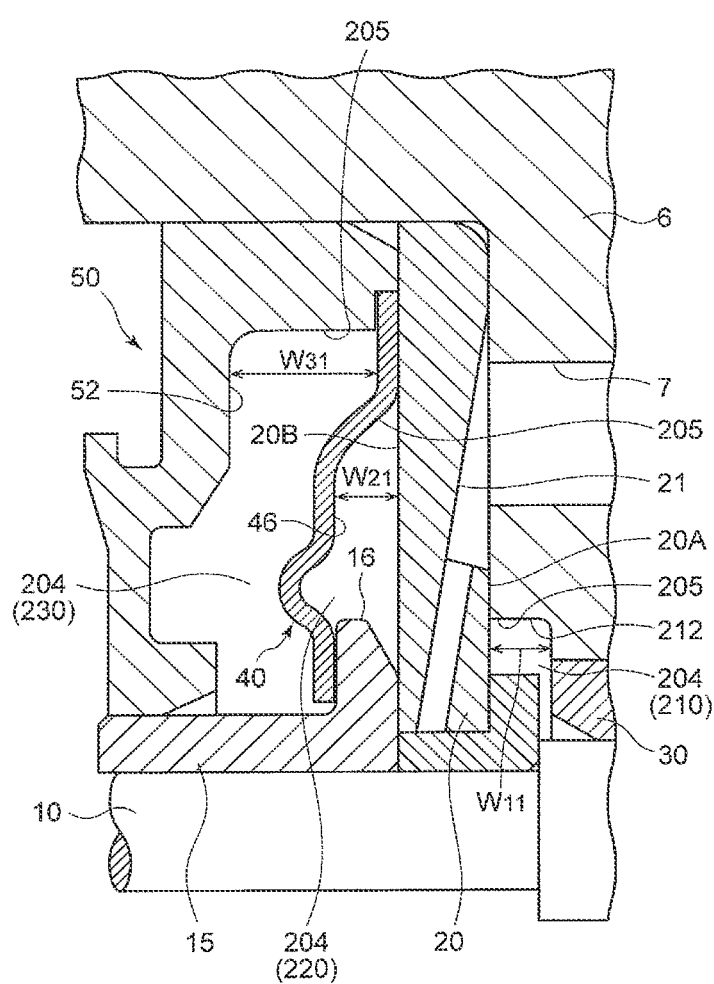
FIG. 15 is a cross-sectional view of a turbomachine including the oil deflector depicted in FIG. 14, taken at the first position ($x=x_1$) in FIG. 14.
Figure 16:
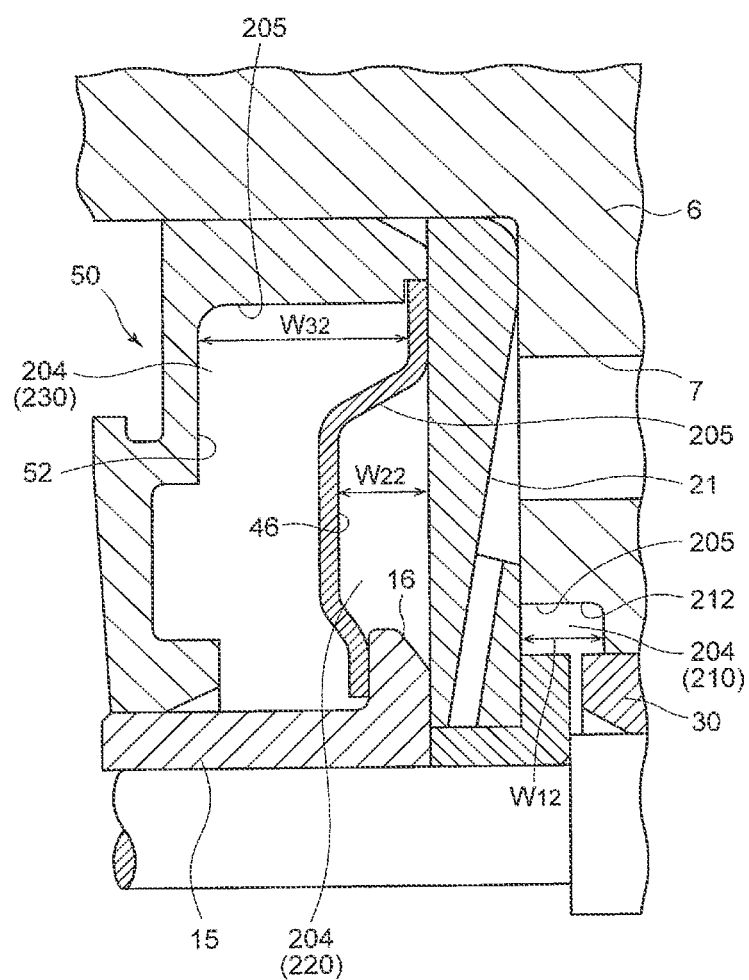
FIG. 16 is a cross-sectional view of a turbomachine including the oil deflector depicted in FIG. 14, taken at the second position ($x=x_2$) in FIG. 14.

FIG. 14 is a perspective view of an oil deflector forming the second oil-drain channel according to an embodiment. FIG. 15 is a cross-sectional view of a turbomachine including the oil deflector depicted in FIG. 14, taken at the first position ($x=x_1$) in FIG. 14. FIG. 16 is a cross-sectional view of a turbomachine including the oil deflector depicted in FIG. 14, taken at the second position ($x=x_2$) in FIG. 14.

In some embodiments, as depicted in FIG. 14, the depth of a recessed portion 46 on the inner side, in the radial direction, of the outer peripheral edge wall (outer peripheral wall 205 of the oil-guide channel portion 204 of the second oil-drain channel 220) of the oil deflector 40 is greater at the second position ($x=x_2$) than at the first position ($x=x_1$).

While the depth of the recessed portion 46 of the oil deflector 40 has a variation in the example of FIG. 14, the depth of the bearing groove 212 of the bearing housing 6 forming the oil-guide channel portion 204 of the first oil-drain channel 210 and/or the depth of the recessed portion 52 of the partition wall (insert) 50 forming the oil-guide channel portion 204 of the third oil-drain channel 230 may have such a variation that the depth is greater at the second position ($x=x_2$) than at the first position ($x=x_1$).

In the embodiment illustrated in FIGS. 15 and 16, when compared at the same radial directional position, the axial directional flow-path width of the oil-guide channel portion 204 is greater at the second position ($x=x_2$) than at the first position ($x=x_1$), for all of the first oil-drain channel 210, the second oil-drain channel 220, and the third oil-drain channel 230.

Specifically, as depicted in FIGS. 15 and 16, the depth of the bearing groove 212 of the bearing 6 is greater at the second position ($x=x_2$) than at the first position ($x=x_1$), and thus the oil-guide channel portion 204 of the first oil-drain channel 210 is greater at the axial directional width $W_{12}$ of the second position than at the axial directional width $W_{11}$ of the first position.

Further, as depicted in FIGS. 15 and 16, the depth of the recessed portion of the oil deflector 40 is greater at the second position (x=x2) than at the first position (x=x1), and thus the oil-guide channel portion 204 of the second oil-drain channel 220 is greater at the axial directional width $W_{22}$ of the second position than at the axial directional width $W_{21}$ of the first position.

Still further, as depicted in FIGS. 15 and 16, the depth of the recessed portion of the partition wall (insert) 50 is greater at the second position ($x=x_2$) than at the first position ($x=x_1$), and thus the oil-guide channel portion 204 of the third oil-drain channel 230 is greater at the axial directional width $W_{32}$ of the second position than at the axial directional width $W_{31}$ of the first position.

In the embodiment illustrated in FIGS. 15 and 16, the oil-guide channel portion 204 has such a variation that the axial directional flow-path width of the oil-guide channel portion 204 is greater at the second position ($x=x_2$) than at the first position ($x=x_1$), for each of the first oil-drain channel 210, the second oil-drain channel 220, and the third oil-drain channel 230, but the oil-guide channel portion 204 may have an axial directional flow-path width that varies in the circumferential direction for at least one of the oil-drain channels 200 (210, 220, 230).

Next, a turbomachine 300 according to another embodiment will be described.

Figure 17:
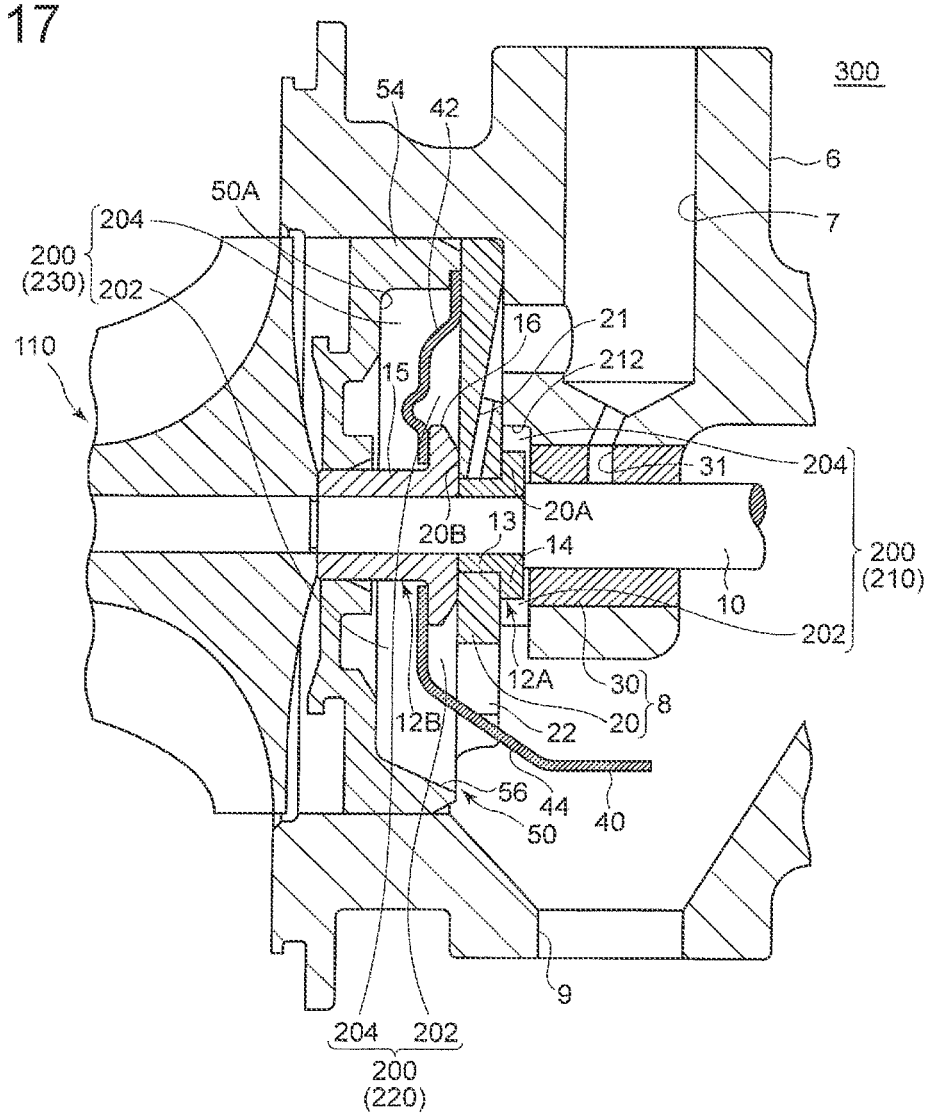
FIG. 17 is a cross-sectional view of a turbomachine according to an embodiment.
Figure 18:
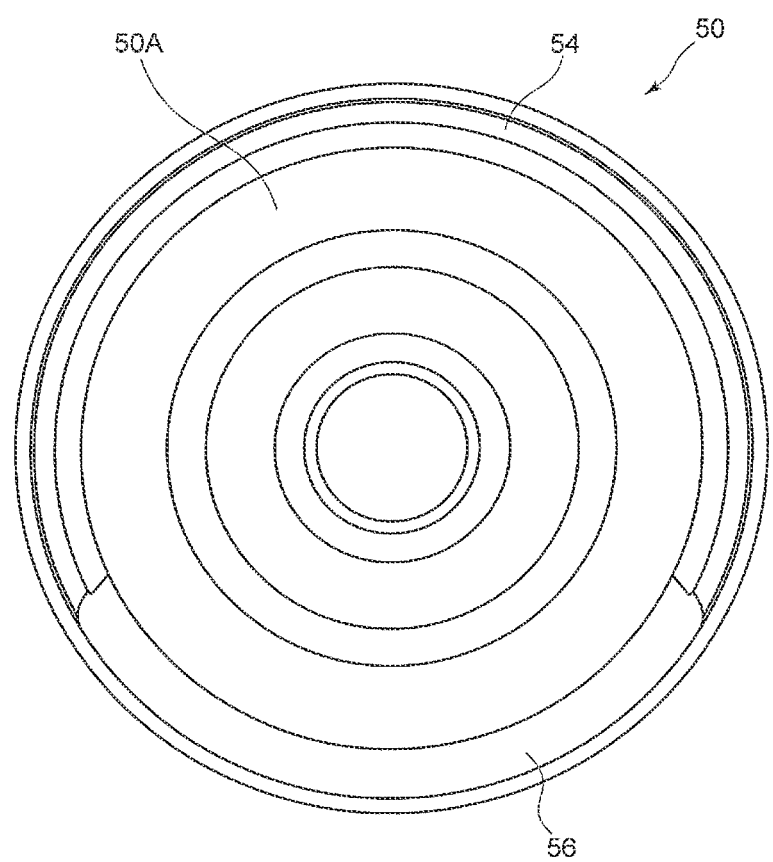
FIG. 18 is a front view of the partition wall (insert) of the turbomachine depicted in FIG. 17.
Figure 19:
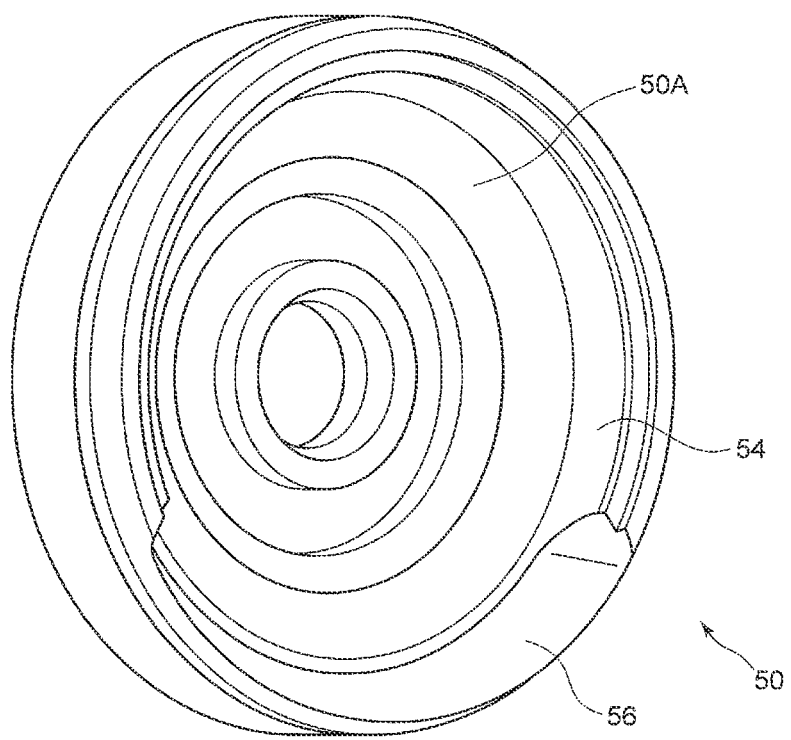
FIG. 19 is a perspective view of the partition wall (insert) of the turbomachine depicted in FIG. 17.

FIG. 17 is a cross-sectional view of the turbomachine 300 according to an embodiment. FIG. 18 is a front view of the partition wall (insert) 50 of the turbomachine 300 depicted in FIG. 17. FIG. 19 is a perspective view of the partition wall (insert) 50 of the turbomachine 300 depicted in FIG. 17.

In FIGS. 17 to 19, the same features as those in FIGS. 2 to 16 are associated with the same reference numerals, and the configuration of the turbomachine 100 described with reference to FIGS. 2 to 16 can be applied to the turbomachine 300 described below. In particular, the specific configuration of each oil-drain channel 200 (210, 220, 230) described with reference to FIGS. 5 to 16 can be applied to each oil-drain channel 200 of the turbomachine 300 described below.

In some embodiments, as depicted in FIG. 17, the partition wall (insert) 50 separating a working-fluid flow path and a bearing space includes an edge portion 54 that extends along the circumferential direction of the rotational shaft 10. The edge portion 54 is disposed so as to protrude toward the thrust bearing 20 from the surface 50A of the partition wall (insert) 50 on the side of the bearing space. The third oil-drain channel 230 is formed by a space surrounded by at least the surface 50A of the partition wall (insert) 50 on the side of the bearing space and the edge portion 54. The surface 50A of the partition wall (insert) 50 on the side of the bearing space may be an uneven surface that has a recessed groove as depicted in FIG. 17, or a flat surface along the radial direction of the turbomachine 300.

In some embodiments, the edge portion 54 of the partition wall (insert) 50 of the turbomachine 300 has its lower region cut off, as depicted in FIGS. 17 to 19, and has a top-bottom asymmetric shape.

As described above, with the edge portion 54 of the partition wall (insert) 50 forming the third oil-drain channel 230 having its lower region cut off into a top-bottom asymmetric shape, discharge of lubricant oil from the oil-drain port portion 202 forming a lower region of the third oil-drain channel 230 is promoted. Accordingly, as compared to a case in which the edge portion 54 of the partition wall (insert) 50 has a top-bottom symmetric shape, lubricant oil and the outer peripheral surface of the thrust collar 12B are less likely to make contact with each other inside the third oil-drain channel 230.

Further, in some embodiments, as depicted in FIGS. 17 to 19, the edge portion 54 has an inclined surface 56 in a cut-off region (lower region) of the edge portion 54. The inclined surface 56 is inclined from the axial direction downward with a distance toward the thrust bearing 20, in the axial direction of the turbomachine 300.

As described above, with the inclined surface 56 provided for the cut-out region (lower region) of the edge portion 54, discharge of lubricant oil from the oil-drain port portion 202 forming a lower region of the third oil-drain channel is promoted even further. Thus, it is possible to effectively prevent lubricant oil and the outer peripheral surface of the thrust collar 12B from making contact with each other inside the third oil-drain channel 230.

Next, a turbomachine 400 according to another embodiment will be described.

Figure 20:
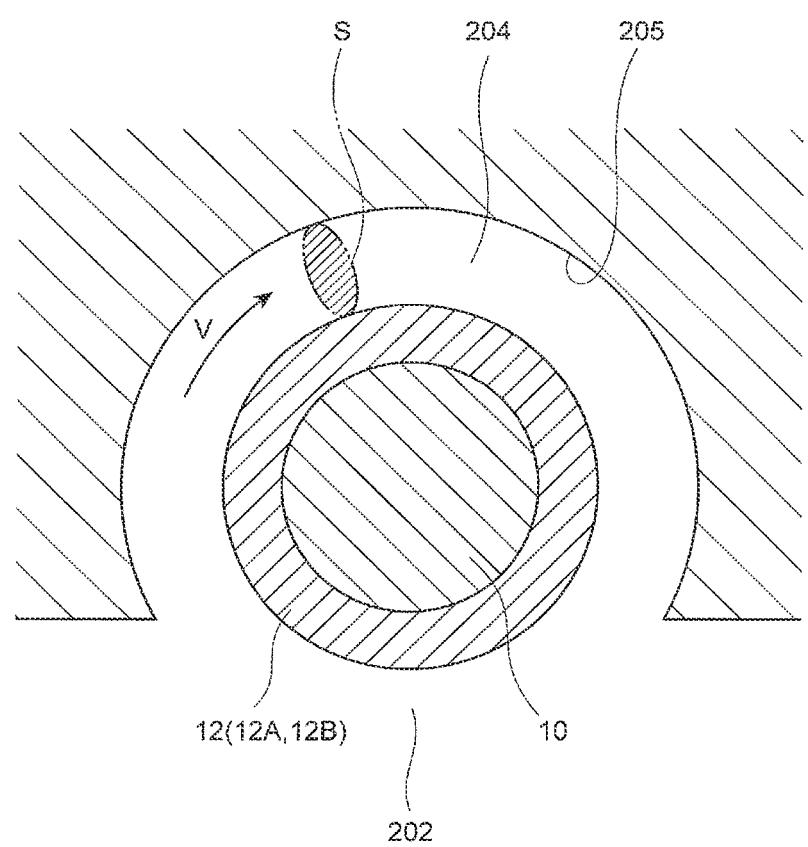
FIG. 20 is a schematic diagram of a configuration of an oil-drain channel of a turbomachine according to an embodiment.

FIG. 20 is a schematic diagram of a configuration of an oil-drain channel 200 of a turbomachine 400 according to an embodiment. Herein, only the configuration of the oil-drain channel 200 will be described, for the turbomachine 400 described below is the same as the turbomachine 100 and the turbomachine 300 described above besides the configuration of the oil-drain channel 200. What have been described for the turbomachine 100 and the turbomachine 300 can also be applied to the turbomachine 400.

The turbomachine 400 includes oil-drain channels 200 (210, 220, 230) disposed around the rotational shaft 10. After lubricating the sliding portions between the thrust bearing 20 and the thrust collars 12 (12A, 12B), the lubricant oil is discharged via oil-drain channels 200 (210, 220, 230). Each oil-drain channel 200 (210, 220, 230) includes an oil-drain port portion 202 for discharging lubricant oil inside the oil-drain channel 200 downward, and an oil-guide channel portion 204 disposed above the oil-drain port portion 202. The oil-guide channel portion 204 is configured to guide lubricant oil from the sliding portions between the thrust bearing 20 and the thrust collars 12 in the circumferential direction and to the oil-drain port portion 202.

In some embodiments, the oil-drain channels 200 (210, 220, 230) are configured to satisfy a relational expression $V \times S > Q$, where V is the flow velocity of lubricant oil at each position of the oil-guide channel portion 204 (see FIG. 20), S is the flow-path cross-sectional area at each position of the oil-guide channel portion 204 (see FIG. 20), and Q is the supply amount of lubricant oil to the thrust bearing 20. Here, the flow velocity V has a dimension of m/s, the flow-path cross-sectional area S has a dimension of $m^2$, and the amount of supply of lubricant oil has a dimension of $m^3/s$. The flow velocity V of lubricant oil refers to a flow velocity along the circumferential direction of the rotational shaft 10. The flow-path cross-sectional area S refers to the total cross-sectional area of the oil-guide channel portions 204 along the radial direction of the rotational shaft 10 (for instance, if the oil-drain channel 200 includes the first oil-drain channel 210, the second oil-drain channel 220, and the third oil-drain channel 230, the total cross sectional area of the oil-guide channel portions 204 of the oil-drain channels 200 (210, 220, 230) combined). The supply amount Q of lubricant oil refers to the flow rate of lubricant oil supplied to the thrust bearing 20 via the oil-supply channel 7 of the bearing housing 6.

As described above, with the relational expression $V \times S > Q$ satisfied at each position of the oil-guide channel portion 204, it is possible to guide lubricant oil smoothly to the oil-drain port portion 202 via the oil-guide channel portion 204 even if the flow rate Q of lubricant oil is discharged to the oil-guide channel portion 204 from the thrust bearing 20. Thus, the high oil-draining performance of the oil-guide channel portion 204 makes it possible to prevent contact between the lubricant oil and the outer peripheral surfaces of the thrust collars 12 (12A, 12B) in the oil-drain channels 200 (210, 220, 230).

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Turbocharger
2 Turbine
3 Turbine wheel
4 Compressor
5 Compressor wheel
6 Housing
6 Bearing housing
7 Oil-supply channel
8 Bearing
9 Oil-drain port
10 Rotational shaft
12, 12A, 12B Thrust collar
13, 15 Sleeve portion
14, 16 Flange portion
20 Thrust bearing
20A First end surface
20B Second end surface
21, 31 Oil-supply hole
22 Opening
30 Radial bearing
40 Oil deflector
42 Disc portion
44 Tongue portion
46 Recessed portion
50 Insert
50A Surface
52 Recessed portion
54 Edge portion
56 Inclined surface
100, 300, 400 Turbomachine
110 Impeller
200 Oil-drain channel
202 Oil-drain port portion
204 Oil-guide channel portion
205 Outer peripheral wall
205A, 205B Linear portion
205C Curve portion
206 Gas-liquid boundary surface
208 Protruding portion
210 First oil-drain channel
212 Bearing groove
220 Second oil-drain channel
230 Third oil-drain channel

The invention claimed is:

1. A turbomachine, comprising:
a rotational shaft;
a pair of thrust collars disposed around the rotational shaft;
a thrust bearing disposed around the rotational shaft at an axial directional position between the pair of thrust collars; and
an annular channel disposed around the rotational shaft in an annular shape, for draining lubricant oil after lubricating a sliding portion between the thrust bearing and the thrust collars,
wherein the annular channel includes:
an oil-drain port portion forming a lower region of the annular channel, for discharging the lubricant oil inside the annular channel downward; and
an oil-guide channel portion disposed above the oil-drain port portion so as to form an upper region of the annular channel and configured to guide the lubricant oil from the sliding portion in a circumferential direction of the rotational shaft to the oil-drain port portion, and
wherein the oil-guide channel portion forming the upper region of the annular channel has an asymmetric shape with respect to a rotational direction of the rotational shaft, the oil-guide channel portion having a minimum flow-path cross sectional area at a first position on an upstream side in the rotational direction, and a maximum flow-path cross sectional area at a second position on a downstream side of the first position, and
wherein the oil-guide channel portion is configured such that the flow-path cross sectional area increases monotonically and continuously from the first position toward the second position along the rotational direction.

2. The turbomachine according to claim 1,
wherein a flow-path width of the oil-guide channel portion in a radial direction of the rotational shaft is greater at the second position than at the first position.

3. The turbomachine according to claim 2,
wherein an outer peripheral edge of the oil-guide channel portion has an arc shape having a center offset from an axial center of the rotational shaft.

4. The turbomachine according to claim 3,
wherein the center of the arc shape is at a position offset from the axial center at least in a horizontal direction from an upstream region toward a downstream region of the oil-guide channel portion in the rotational direction.

5. The turbomachine according to claim 1,
wherein a flow path of the oil-guide channel portion in an axial direction of the rotational shaft is greater at the second position than at the first position.

6. The turbomachine according to claim 1,
wherein a flow-path cross sectional area of the oil-guide channel portion is smaller at a most upstream position in the rotational direction than at a most downstream position in the rotational direction.

7. The turbomachine according to claim 1, wherein an outer peripheral edge of the oil-guide channel portion has a shape formed by: a combination of one or more curves; a combination of a plurality of lines; or a combination of one or more lines and one or more curves.

8. The turbomachine according to claim 1, further comprising a bearing housing for housing the thrust bearing, wherein the annular channel includes a first oil-drain channel formed by a space surrounded by a first end surface of the thrust bearing and a bearing groove formed on an inner wall surface of the bearing housing facing the first end surface.

9. The turbomachine according to claim 1, further comprising an oil deflector disposed so as to face a second end surface of the thrust bearing and an end surface of the thrust collar disposed on a side of the second end surface, the end surface being opposite from a sliding surface between the thrust collar and the thrust bearing,
wherein the annular channel includes a second oil-drain channel formed by a space surrounded by the oil deflector, the thrust collar, and the thrust bearing.

10. The turbomachine according to any one of claim 1, further comprising:
an impeller configured to rotate with the rotational shaft;
a working-fluid flow path in which the impeller is disposed and through which a working fluid flows; and
a partition wall separating the working-fluid flow path and a bearing space housing the thrust bearing and the pair of thrust collars,
wherein the annular channel includes a third oil-drain channel formed by a space surrounded by at least the partition wall.

11. The turbomachine according to claim 1, wherein a relational expression $V \times S > Q$ is satisfied, where V is a flow rate of the lubricant oil at each position in the oil-guide channel portion, S is a flow-path cross sectional area S at each position in the oil-guide channel portion, and Q is a supply amount of the lubricant oil to the thrust bearing.

12. The turbomachine according to claim 11, wherein the turbomachine is a turbocharger including a turbine and a compressor disposed on either side of the rotational shaft.

13. The turbomachine according to claim 1, wherein the turbomachine is a turbocharger including a turbine and a compressor disposed on either side of the rotational shaft.

* * * * *